United States Patent
Hanson et al.

(10) Patent No.: US 12,431,792 B2
(45) Date of Patent: Sep. 30, 2025

(54) SYNCHRONOUS SWITCH-MODE ACTIVE ELECTROMAGNETIC INTERFERENCE CANCELLATION CIRCUIT AND METHOD

(71) Applicant: Board of Regents, The University of Texas System, Austin, TX (US)

(72) Inventors: Alex J. Hanson, Austin, TX (US); Duy T. Nguyen, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 147 days.

(21) Appl. No.: 18/165,887

(22) Filed: Feb. 7, 2023

(65) Prior Publication Data

US 2023/0253878 A1 Aug. 10, 2023

Related U.S. Application Data

(60) Provisional application No. 63/307,565, filed on Feb. 7, 2022.

(51) Int. Cl.
*H02M 3/155* (2006.01)
*H02M 1/44* (2007.01)

(52) U.S. Cl.
CPC ............ *H02M 1/44* (2013.01); *H02M 3/155* (2013.01)

(58) Field of Classification Search
CPC ...................... H02M 1/15; H02M 3/155–1588
See application file for complete search history.

(56) References Cited

U.S. PATENT DOCUMENTS

| | | | |
|---|---|---|---|
| 6,252,512 B1* | 6/2001 | Riley | G01L 1/162 340/665 |
| 11,502,594 B2* | 11/2022 | Angell | H02M 3/158 |
| 2006/0158163 A1* | 7/2006 | Machesney | H02M 3/1584 323/246 |
| 2008/0096511 A1* | 4/2008 | Burmeister | H04B 15/005 455/296 |
| 2023/0021179 A1* | 1/2023 | Tang | H05K 1/113 |

OTHER PUBLICATIONS

Y. Yang, "EMI Noise Reduction Techniques for High Frequency Power Converters," Ph.D. dissertation, Virginia Polytechnic Institute and State University, 2018. 158 pages.

(Continued)

*Primary Examiner* — Peter M Novak
(74) *Attorney, Agent, or Firm* — Meunier Carlin & Curfman LLC

(57) ABSTRACT

A switch-mode active electromagnetic interference (EMI) cancellation circuit comprising a set of low-voltage switching elements and a low-voltage inductor or capacitor located at an input to, or at an output from, a set of high-voltage switching elements employed for the power conversion, wherein a controller is operatively coupled to the second set of switching elements to control switching operations of the second set of switching elements at to apply an opposing matching alternating voltage or current into the inductor or capacitor to cancel that high-frequency ripples flowing through the inductor or capacitor generated from the switching of the set of switching elements of the power converter.

19 Claims, 18 Drawing Sheets

(56) References Cited

OTHER PUBLICATIONS

N. Poon, J. Liu, C. Tse, and M. Pong, "Techniques for input ripple current cancellation: Classification and implementation [in SMPS]," IEEE Transactions on Power Electronics, vol. 15, No. 6, pp. 1144-1152, Nov. 2000.

R. Goswami, S. Wang, E. Solodovnik, and K. J. Karimi, "Differential Mode Active EMI Filter Design for a Boost Power Factor Correction AC/DC Converter," IEEE Journal of Emerging and Selected Topics in Power Electronics, vol. 7, No. 1, pp. 576-590, Mar. 2019.

D. T. Nguyen, E. Macias, and A. J. Hanson, "Active EMI Filter with Switch-Mode Amplifier for High Efficiency," in 2022 IEEE Applied Power Electronics Conference and Exposition (APEC), Mar. 2022.

Wenjie Chen, W. Zhang, X. Yang, Z. Sheng, and Z. Wang, "An Experimental Study of Common- and Differential-Mode Active EMI Filter Compensation Characteristics," IEEE Transactions on Electromagnetic Compatibility, vol. 51, No. 3, pp. 683-691, Aug. 2009.

P. Wang, C. Tao, and J. Zhang, "Research and design of a common mode hybrid EMI filter for switch-mode power supply," in 2009 3rd International Conference on Power Electronics Systems and Applications (PESA), 2009, pp. 1-4.

M. L. Heldwein, H. Ertl, J. Biela, and J. W. Kolar, "Implementation of a Transformerless Common-Mode Active Filter for Offline Converter Systems," IEEE Transactions on Industrial Electronics, vol. 57, No. 5, pp. 1772-1786, May 2010.

M. Ali, E. Laboure, and F. Costa, "Integrated hybrid EMI filter: Study and realization of the active part," in 2013 15th European Conference on Power Electronics and Applications (EPE). Lille, France: IEEE, Sep. 2013, pp. 1-8.

R. Goswami and S. Wang, "Investigation of multiple feedback active filter configurations for differential mode(DM) electromagnetic interference(EMI) noise in AC/DC converter applications," in IECON 2017—43rd Annual Conference of the IEEE Industrial Electronics Society, Oct. 2017, pp. 7018-7023.

Y. Sha, W. Chen, Z. Zhao, F. Zhang, C. Pei, and Z. Chen, "Research of active EMI suppression strategy for high power density power supply," in 2018 IEEE Applied Power Electronics Conference and Exposition (APEC), Mar. 2018, pp. 611-614.

Z. Zhang, W. Chen, A. M. Bazzi, S. Ramsay, J. Czapor, and J. Aslanidis, "A new active EMI filter with virtual impedance enhancement," in 2018 IEEE Applied Power Electronics Conference and Exposition (APEC). San Antonio, TX, USA: IEEE, Mar. 2018, pp. 2393-2397.

L. Dai, W. Chen, Y. Yang, R. Wang, and X. Yang, "Design of Active EMI Filters With the Integrated Passive Component," in 2019 IEEE Applied Power Electronics Conference and Exposition (APEC), Mar. 2019, pp. 640-643.

S. Jiang, Y. Liu, W. Liang, J. Peng, and H. Jiang, "Active EMI Filter Design With a Modified LCL-LC Filter for Single-Phase Grid-Connected Inverter in Vehicle-to-Grid Application," IEEE Transactions on Vehicular Technology, vol. 68, No. 11, pp. 10 639-10 650, Nov. 2019.

M. Najjar, A. Kouchaki, and M. Nymand, "Evaluation of Active Common Mode Filter Utilization for Size Optimization of a 20 kW Power Factor Correction," in 2019 IEEE 13th International Conference on Compatibility, Power Electronics and Power Engineering (CPEPOWERENG), Apr. 2019, pp. 1-5.

Y. Zhang, Q. Li, and D. Jiang, "A Motor CM Impedance Based Transformerless Active EMI Filter for DC-Side Common-Mode EMI Suppression in Motor Drive System," IEEE Transactions on Power Electronics, vol. 35, No. 10, pp. 10 238-10 248, Oct. 2020.

Z. Wang, "Conducted EMI Noise Prediction and Filter Design Optimization," Ph.D. dissertation, Virginia Polytechnic Institute and State University, 2018. 160 pages.

A. J. Hanson, J. A. Belk, S. Lim, C. R. Sullivan, and D. J. Perreault, "Measurements and Performance Factor Comparisons of Magnetic Materials at High Frequency," IEEE Transactions on Power Electronics, vol. 31, No. 11, pp. 7909-7925, Nov. 2016.

S. Das, I. Pan, S. Saha, A. Kumar, S. Das, and A. Gupta, "Revisiting oustaloup's recursive filter for analog realization of fractional order differintegrators," in 2011 International Conference on Energy, Automation and Signal, 2011, pp. 1-6.

R. Matusu, "Application of fractional order calculus to control theory," International Journal of Mathematical Models and Methods in Applied Sciences, vol. 5, pp. 1162-1169, Jan. 2011.

J. Valsa, P. Dvok, and M. Friedl, "Network model of the CPE," Radioengineering, vol. 20, Sep. 2011.

E. Gonzalez, . Dork, C. Monje, J. Valsa, F. Caluyo, and I. Petr, "Conceptual Design of a Selectable Fractional-Order Differentiator for Industrial applications," Fractional Calculus and Applied Analysis, vol. 17, Sep. 2014.

Y. Zhang, J. Strydom, M. de Rooij, and D. Maksimovi, "Envelope tracking gan power supply for 4g cell phone base stations," in 2016 IEEE Applied Power Electronics Conference and Exposition (APEC), 2016, pp. 2292-2297.

Y. Zhang, M. Rodrguez, and D. Maksimovi, "100 mhz, 20 v, 90synchronous buck converter with integrated gate driver," in 2014 IEEE Energy Conversion Congress and Exposition (ECCE), 2014, pp. 3664-3671.

L. Mirkin and Z. J. Palmor, Control Issues in Systems with Loop Delays. Boston, MA: Birkhäuser Boston, 2005, pp. 627-648.

D. T. Nguyen, C. Deng, E. Macias, and A. J. Hanson, "Synchronously Switched Active EMI Filter," 2022 IEEE Energy Conversion Congress and Exposition (ECCE), Detroit, MI, USA, 2022, pp. 1-8.

D. T. Nguyen, E. Macias, and A. J. Hanson, "Active EMI Filter with Switch-Mode Amplifier for High Efficiency," 2022 IEEE Applied Power Electronics Conference and Exposition (APEC), Houston, TX, USA, 2022, pp. 443-450,.

* cited by examiner

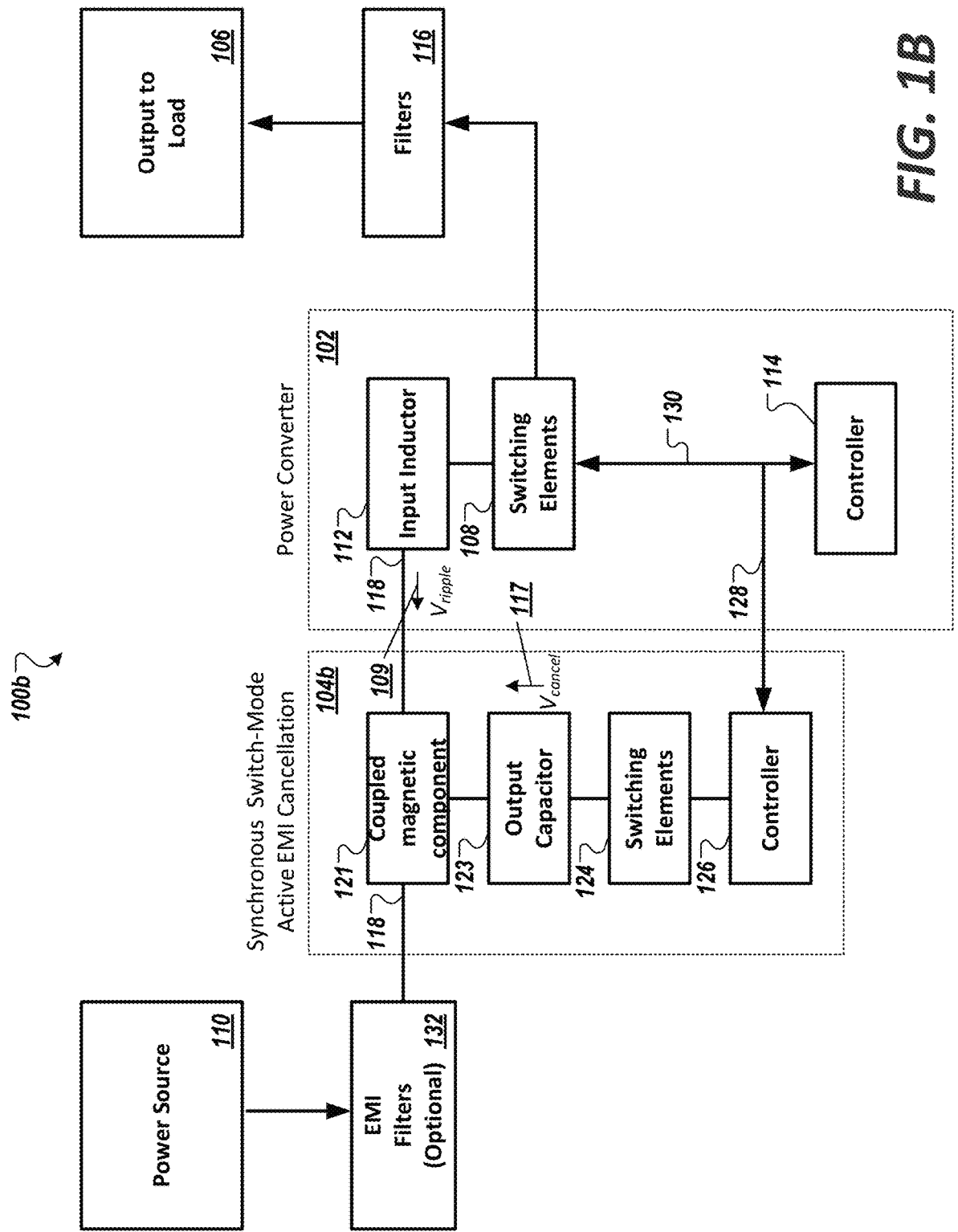

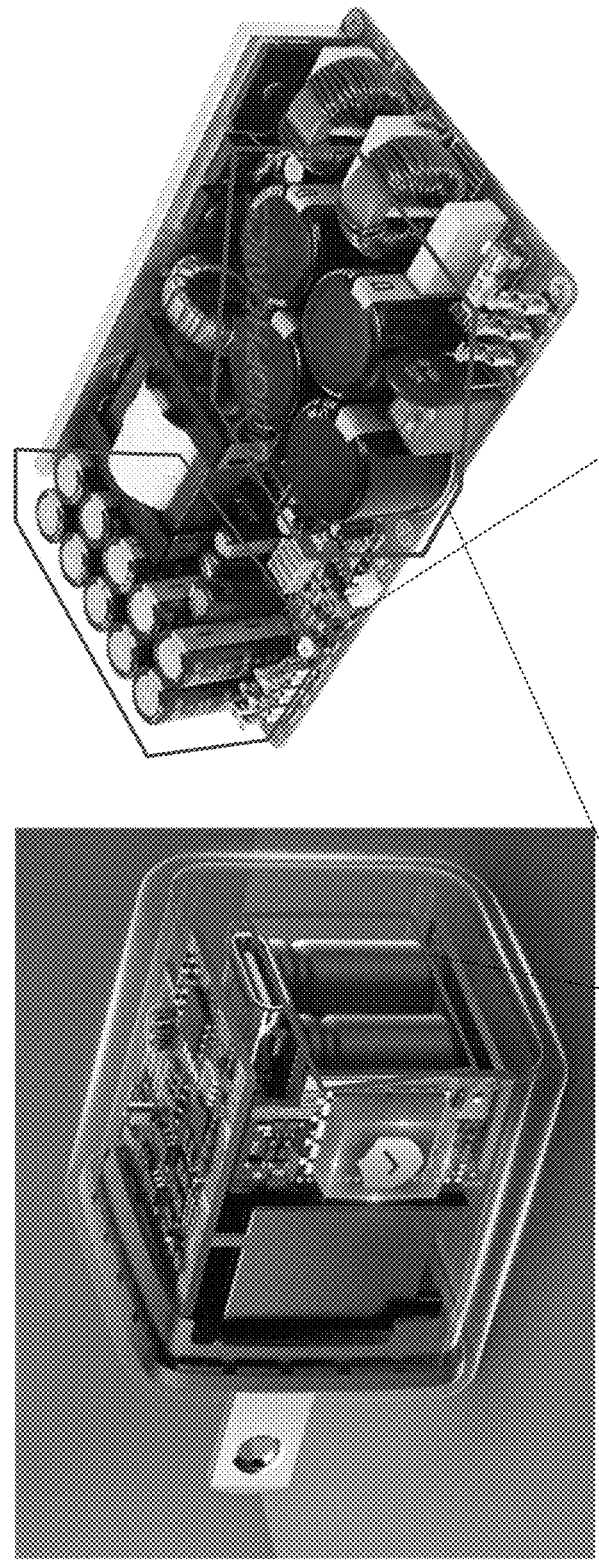
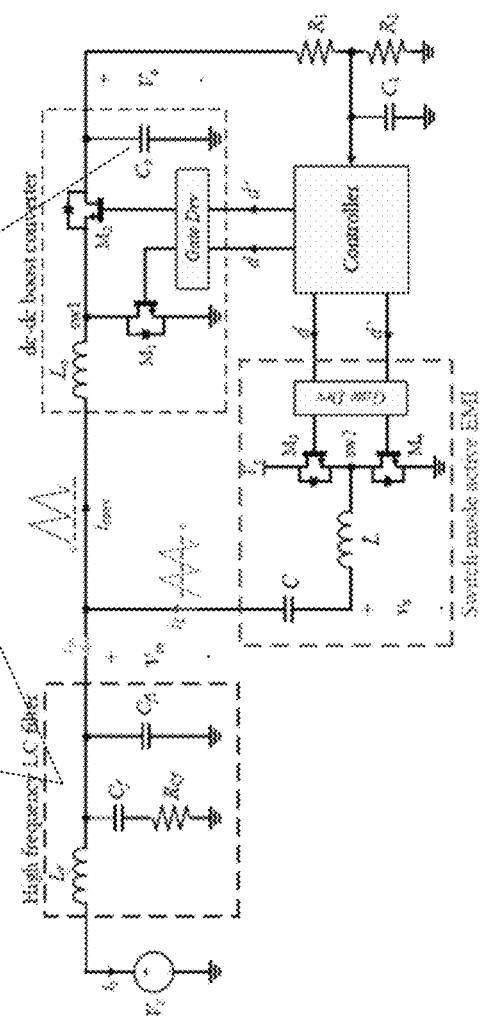
FIG. 2D

300

---

Control switching operations of the first set of switching elements of a power converter to perform the power conversion task
302

↓

Control switching operations of a second set of switching elements of a switch mode active electromagnetic interference cancellation circuit to operatively apply an opposite alternating voltage or current at a second inductor that is coupled to an input of the first set of switching elements to cancel high-frequency ripples flowing through an inductor of the power converter
304

↓

Adjust the controlling of the switching operations of the second set of switching elements based on the controlling of the switching operations of the first set of switching elements
306

Control, via circuitry or instructions, switching operations of a set of switching elements of a switch mode active electromagnetic interference cancellation circuit to generate a high-frequency opposing alternating voltage or current (e.g., greater than 30 MHz) at an inductor that is coupled to an input of a power converter
402

Receive a feedback signal sampled at the input to the set of switching elements of the power converter
404

Adjust the controlling of the switching operations based on the received control signals
406

*FIG. 4B*

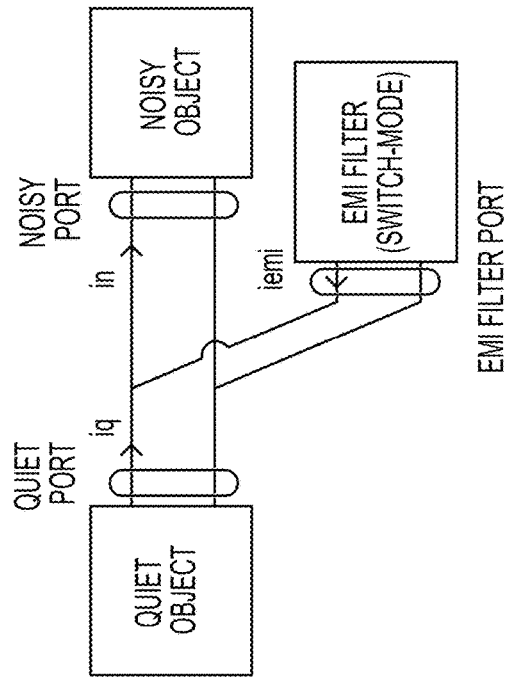
*FIG. 5A CONT.*
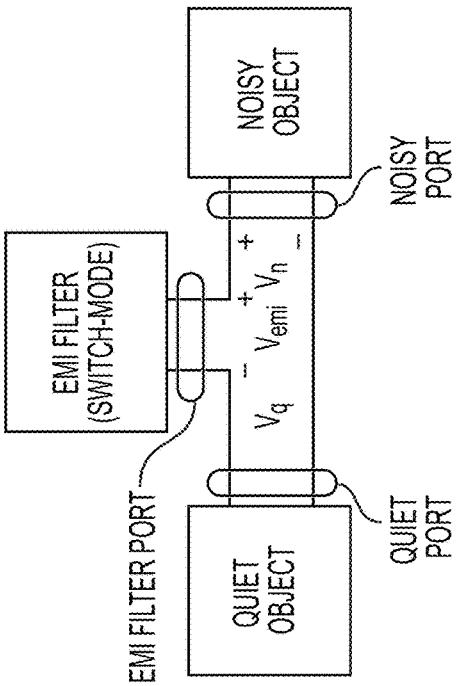
*FIG. 6A*
*FIG. 6B*

SYNCHRONOUS SWITCH-MODE ACTIVE ELECTROMAGNETIC INTERFERENCE CANCELLATION CIRCUIT AND METHOD

RELATED APPLICATION

This application claims priority to, and the benefit of, U.S. Provisional Patent Application No. 63/307,565, filed Feb. 7, 2022, entitled "Synchronous Switch-Mode Active Electromagnetic Interference Cancellation Circuit and Method," which is hereby incorporated by reference herein in its entirety.

BACKGROUND

AC-DC and DC-DC converters are employed ubiquitously in everyday electronic devices, for example, as the power supply and regulators for mobile communication devices (e.g., smartphones), laptops, televisions, game consoles, home automation systems, audio systems, and various entertainment and control systems. The Federal Communication Commission (FCC) establishes strict guidelines for electromagnetic interference (EMI) and radio-frequency interference (RFI) by consumer electronic devices.

Passive EMI filters are commonly used in consumer electronic devices as they do not draw power unless the electronic device is being used. Passive EMI filters generally include an inductor and a capacitor. The most common capacitors are electrolytic capacitors (because of their cost) that vary in size (e.g., between 22.5 mm to 64 mm in diameter and 41 mm to 143 mm in length for 15 VDC to 100 VDC, respectively) based on their capacitance value and rated voltage.

Active EMI filters employ linear regulators to cancel out the interference generated by the AC-DC and DC-DC converters. By canceling the interference, substantially smaller EMI filter components may be employed or none at all. Conventional active EMI filters, however, draw power even when the electronic device is not enabled. Power electronic designers can trade off between these two approaches based on size, power, and requirements.

There is a benefit to improving the designs of EMI filters to make them more compact while meeting the strict EMI and RFI guidelines.

SUMMARY

A switch-mode active electromagnetic interference (EMI) cancellation circuit is disclosed comprising a set of low-voltage switching elements and a low-voltage inductor or capacitor located at an input to, or at an output from, a set of high-voltage switching elements employed for the power conversion, wherein a controller (e.g., of the power converter or a separate controller) is operatively coupled to the second set of switching elements to control switching operations of the second set of switching elements at to apply an opposing matching alternating voltage or current (e.g., opposite in magnitude or 180-degree offset) into the inductor or capacitor to cancel that high-frequency ripples flowing through the inductor or capacitor generated from the switching of the set of switching elements of the power converter. The exemplary switch-mode active EMI cancellation circuit, in some embodiments, is configured as a synchronous switch-mode Active EMI Filter (AEF) that may be a separate or integrated component to a power converter and employ the same corresponding command signals from the switching elements of the power conversion application. In other embodiments, the exemplary switch-mode active EMI cancellation circuit is configured as a high-frequency switch-mode Active EMI Filter.

In some embodiments, the exemplary switch mode active EMI cancellation circuit can be implemented using components having a size on the order of 2-3% of the total power converter volume. In comparison, conventional passive EMI filters may take up to 20-40% of that volume for a similar EMI operation for a given power conversion device—the reduction in volume for those large components can be over 99%.

The exemplary switch mode active EMI cancellation circuit may be employed to suppress or entirely remove EMI noise for an AC-DC converter, DC-DC converter, AC-AC converter, or DC-AC converter. It may also be employed in combination with or using a passive EMI filter (e.g., a high-frequency LC filter), an active EMI filter comprising a linear amplifier, or a combination thereof, to reduce the filtering requirement of such systems. Notably, because the size of passive EMI filters proportionally scales to the attenuation needed, a reduction in EMI noise due to exemplary EMI cancellation can substantially reduce the size of passive EMI filter components in such combinations. As noted above, conventional passive EMI filters may take up to 20-40% of the volume of a power conversion device (e.g., power supply).

To operate using lower-voltage components, the exemplary switch mode active EMI cancellation circuit can connect to the switching elements of the main circuit through a DC blocking capacitor or coupled-magnetic component (e.g., transformer), isolating its components from the power bus. In a typical application such as a grid-connected power factor correction (PFC) converter, the exemplary switch mode active EMI cancellation circuit may be supplied by a voltage less than 40 times that of the output voltage of the PFC, resulting in a subcircuit with 40 times lower voltage rating on switches and 40 times less magnetic energy storage.

A switching element refers to a power-semiconductor switching element such as MOSFET, IGBT, BJT, and other semiconductor devices that are employed in power conversion applications, e.g., for changing voltage and/or current, changing frequency (in the case of AC/AC), charging an energy storage device such as a battery, drawing maximum power from a source, or depositing maximum power to a load. The switching elements, through the power conversion application, generate the ripple power bus during their switching, which can be viewed as electromagnetic interference.

An example switch mode active EMI cancellation circuit is disclosed that can provide very high current attenuation of over 71 dB at the fundamental frequency of 150 kHz and consumes extremely low power of 0.23 W while filtering large current with the ripple ratio of 1.5 times from a 320 W dc-dc boost converter.

In another aspect, a high-efficiency switch-mode active EMI cancellation circuit is disclosed that is configured to control switching of canceling switching elements at a frequency range (e.g., greater than 31 MHz) outside a defined EMI range. The control may be based on feedback signals at the input to the power conversion circuit.

In an aspect (e.g., for synchronous operation), an apparatus is disclosed comprising a power converter (e.g., AC-DC converter, DC-DC converter, AC-AC converter, DC-AC converter) comprising a first set of switching elements and a first inductor or capacitor located at an input to, or at an output from, the set of switching elements to convert at least one of (i) an input alternating current (AC) electrical energy into direct current (DC) electrical energy and (ii) a first DC electrical energy into a second DC electrical energy; and a switch mode active electromagnetic interference cancellation circuit comprising a second set of switching elements and a second inductor or capacitor located at an input to, or at an output from, the first set of switching elements, wherein a controller is operatively coupled to the second set of switching elements to control switching operations of the second set of switching elements at matching alternating voltage or current in the first inductor to that of the second inductor, wherein the alternating voltage or current in the second inductor is scaled to a same or lower alternating voltage or current to that of the first inductor to cancel electromagnetic interference generated by the first set of switching elements.

In some embodiments, the second inductor or capacitor of the switch-mode active electromagnetic interference cancellation circuit is coupled to the inductor or capacitor of the power converter through a DC blocking capacitor or a coupled-magnetic component (e.g., transformer).

In some embodiments, the controller is configured to control the switching operations of the second set of switching elements based on control signals that control the first set of switching elements to convert the input alternating current (AC) electrical energy into the direct current (DC) electrical energy.

In some embodiments, the alternating voltage or current in the second inductor or capacitor is applied at a same voltage or current as that of the first inductor or capacitor to cancel electromagnetic interference generated by the first set of switching elements.

In some embodiments, the alternating voltage or current in the second inductor or capacitor is applied at a low or higher voltage or current than that of the first inductor or capacitor to cancel electromagnetic interference generated by the first set of switching elements.

In some embodiments, the power converter is configured as at least one of a buck-boost converter, a single-ended primary-inductor converter (SEPIC) converter, a Cuk converter, a boost converter, and an interleaved boost converter.

In some embodiments, the second set of switching elements and a second inductor or capacitor of the switch-mode active electromagnetic interference cancellation circuit are located at the input to the second set of switching elements of the power converter.

In some embodiments, the second set of switching elements and a second inductor or capacitor of the switch-mode active electromagnetic interference cancellation circuit are located at the output of the second set of switching elements of the power converter.

In some embodiments, the apparatus further includes a passive electromagnetic interference (EMI) filter (e.g., a high-frequency LC filter) and/or an active EMI filter based on a linear amplifier.

In some embodiments, the second set of switching elements of the switch-mode active electromagnetic interference cancellation circuit is coupled to the second inductor or capacitor through a winding, wherein the output of the switch-mode active electromagnetic interference cancellation circuit generates an opposite voltage at the second inductor or capacitor to that of the first inductor or capacitor.

In some embodiments, the second inductor or capacitor is connected in series with the first inductor or capacitor.

In some embodiments, the second inductor or capacitor comprises a piezoelectric device having both inductive and capacitive properties.

In another aspect, an apparatus is disclosed comprising a power converter (e.g., AC-DC converter, DC-DC converter, AC-AC converter, DC-AC converter) or electric circuit comprising a first set of switching elements and a first inductor or capacitor located at an input to, or at an output from, the set of switching elements; and a switch-mode active electromagnetic interference cancellation circuit comprising a controller (e.g., microcontroller, ASIC, or discrete circuits), a second set of switching elements, and a second inductor or capacitor located at an input to, or at an output from, the first set of switching elements, wherein the controller of the switch-mode active electromagnetic interference cancellation circuit is configured to control switching operations of the second set of switching elements based on a feedback signal that is sampled at the input to the first set of switching elements of the power converter.

In some embodiments, the first set of switching elements are configured to switch at a first harmonic frequency, and wherein the second set of switching elements are configured to switch at a second harmonic frequency, wherein the second harmonic frequency is higher than the first harmonic frequency.

In some embodiments, the second harmonic frequency is higher than 31 MHz (i.e., outside EMI regulated range).

In another aspect, a method is disclosed to filter EMI of a power converter (e.g., AC-DC converter, DC-DC converter, AC-AC converter, DC-AC converter) or electric circuit, the power converter or electric circuit comprising a first set of switching elements and a first inductor/capacitor configured to perform a power conversion or switching task (e.g., changing voltage and/or current, changing frequency (in the case of ac/ac), charging an energy storage device such as a battery, drawing maximum power from a source or depositing maximum power to a load), the method comprising: controlling, via circuitry or instructions, switching operations of a second set of switching elements of a switch mode active electromagnetic interference cancellation circuit to operatively apply an opposite alternating voltage or current at a second inductor or capacitor that is coupled to an input of the first set of switching elements to cancel high-frequency ripples flowing through the first inductor or capacitor and associated with switching of the first set of switching elements, wherein the switching operations of the second set of switching elements are at a frequency range (e.g., greater than 31 MHz) outside a defined-EMI or pre-defined range.

In some embodiments, the method further includes receiving a feedback signal sampled at the input to the first set of switching elements of the power converter; and adjusting the controlling of the switching operations based on the received feedback signal.

In another aspect, a method is disclosed to filter EMI of a power converter (e.g., AC-DC converter, DC-DC converter, AC-AC converter, DC-AC converter) or electric circuit, the power converter or electric circuit comprising a first set of switching elements configured to perform a power conversion task or switching task (e.g., changing voltage and/or current, changing frequency (in the case of ac/ac), charging an energy storage device such as a battery, drawing maximum power from a source or depositing maximum power to a load), the method comprising: controlling, via circuitry or instructions, switching operations of the first set of switching elements to perform the power conversion or switching task; controlling, via circuitry or instructions, switching operations of a second set of switching elements of a switch mode active electromagnetic interference cancellation circuit to operatively apply an opposite alternating voltage or current at a second inductor or capacitor that is coupled to an input of the first set of switching elements to cancel high-frequency ripples flowing through a first inductor or capacitor of the power converter or electric circuit; and adjusting the controlling of the switching operations of the second set of switching elements based on the controlling of the switching operations of the first set of switching elements.

In some embodiments, the apparatus is a power converter, and the power converter is configured as at least one of a buck-boost converter, a single-ended primary-inductor converter (SEPIC) converter, a Cuk converter, a boost converter, and an interleaved boost converter.

In some embodiments, the second inductor or capacitor of the switch-mode active electromagnetic interference cancellation circuit is coupled to the first inductor or capacitor of the power converter through a DC blocking capacitor or a coupled-magnetic component (e.g., transformer).

In some embodiments, the opposite voltage or current in the second inductor or capacitor is applied at a same voltage or current to that of the first inductor or capacitor to cancel electromagnetic interference generated by the first set of switching elements.

In some embodiments, the opposite voltage or current in the second inductor or capacitor is applied at a low or higher voltage or current to that of the first inductor or capacitor to cancel electromagnetic interference generated by the first set of switching elements.

In some embodiments, the apparatus is a power converter, and the power converter includes a passive electromagnetic interference (EMI) filter (e.g., a high-frequency LC filter) and/or an active EMI filter based on a linear amplifier.

In some embodiments, the second set of switching elements and a second inductor or capacitor of the switch-mode active electromagnetic interference cancellation circuit are located at the input to the second set of switching elements of the power converter or electric circuit.

In some embodiments, the second set of switching elements and a second inductor or capacitor of the switch-mode active electromagnetic interference cancellation circuit are located at the output of the second set of switching elements of the power converter or electric circuit.

In another aspect, a system (e.g., laptop, mobile/smartphone) is disclosed comprising a switch-mode active electromagnetic interference cancellation circuit configured to perform any of the above-discussed methods.

BRIEF DESCRIPTION OF DRAWINGS

Embodiments of the present invention may be better understood from the following detailed description when read in conjunction with the accompanying drawings. Such embodiments, which are for illustrative purposes only, depict novel and non-obvious aspects of the invention. The drawings include the following figures:

FIGS. 1A and 1B each shows an example system comprising a power converter and a synchronous switch-mode active electromagnetic interference cancellation circuit configured to reduce or remove the EMI of a power converter in accordance with an illustrative embodiment.

FIG. 2D shows two example converter circuits, each configured with a passive EMI filter, which may be substantially reduced using the synchronous switch-mode active electromagnetic interference cancellation circuit.

FIG. 3 shows an example method of operation of the synchronous switch-mode AEF in accordance with an illustrative embodiment.

FIG. 4B shows a diagram of another example active EMI filtering system with high-frequency switch-mode amplifier operation in accordance with an illustrative embodiment.

FIGS. 6A and 6B each shows an example of electric circuit ports coupled to a synchronous or high-frequency switch-mode active electromagnetic interference cancellation circuit in accordance with an illustrative embodiment.

DETAILED SPECIFICATION

Each and every feature described herein, and each and every combination of two or more of such features, is included within the scope of the present invention provided that the features included in such a combination are not mutually inconsistent.

Some references, which may include various patents, patent applications, and publications, are cited in a reference list and discussed in the disclosure provided herein. The citation and/or discussion of such references is provided merely to clarify the description of the disclosed technology and is not an admission that any such reference is "prior art" to any aspects of the disclosed technology described herein. In terms of notation, "[n]" corresponds to the $n^{th}$ reference in the list. All references cited and discussed in this specification are incorporated herein by reference in their entireties and to the same extent as if each reference was individually incorporated by reference.

EXAMPLE SYSTEM

Figure 1A:
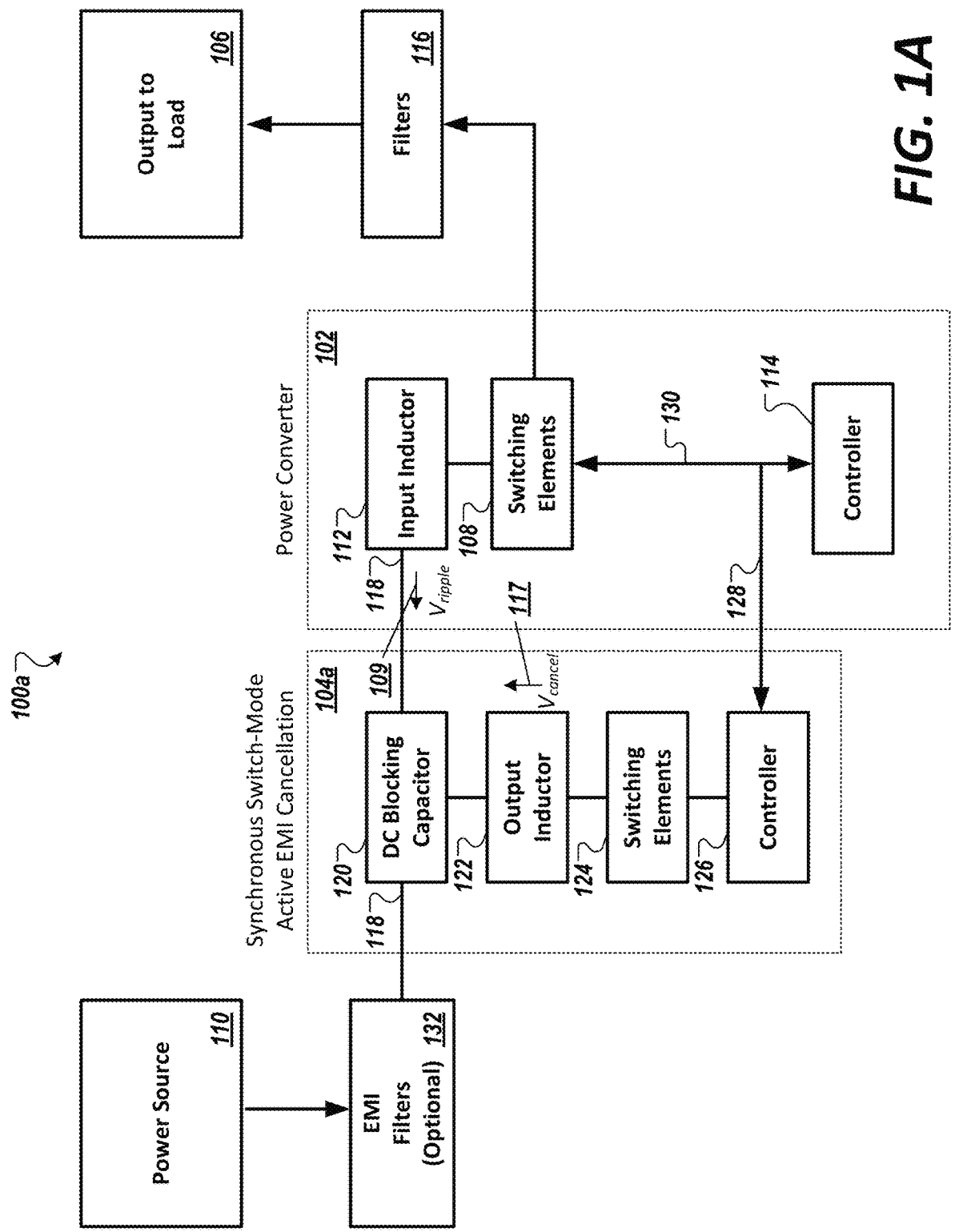

FIGS. 1A and 1B each shows an example system 100 (shown as 100a, 100b) comprising a power converter 102 (or electric circuit) and a synchronous switch-mode active electromagnetic interference cancellation circuit 104 (shown as 104a, 104b) that is configured to reduce or remove EMI at the input or output of the power converter 102 in accordance with an illustrative embodiment. In the examples shown in FIGS. 1A and 1B, the power converter 102 is coupled to and configured to provide electrical energy for a set of loads 106.

In the example of a power converter, the power converter can be employed to change voltage and/or current, change frequency (in the case of ac/ac), charge an energy storage device such as a battery, draw maximum power from a source, or deposit maximum power to a load. The power converter 102 includes a set of switching elements 108 that receive input from a power source 108 to perform the power conversion operation. The power conversion operation can generate ripples 109 (shown as "$V_{ripple}$" 109) that can emanate back to the power source 110 as electromagnetic interference. The power converter 102 includes an input inductor 112, a controller 114, and a filter 116.

In the example of an electric circuit, the electric circuit includes a switching elements or component that can generate noise in the form of voltage or current ripples.

The exemplary switch mode active EMI cancellation circuit (e.g., 104a, 104b) is configured to generate an opposing matching alternating voltage or current (shown as "$V_{cancel}$" 117) that is opposite in magnitude or 180-degree offset to the ripples 109 to cancel the ripple 109 from the power bus connected to the power converter or electric circuit. In other embodiments, the exemplary active EMI cancellation circuit (e.g., 104a, 104b) can be coupled to the output of the power converter 102 (not shown, see FIG. 2C). The exemplary active EMI cancellation circuit (e.g., 104a, 104b) can augment or serve as a replacement of passive EMI filters typically employed in most power conversion applications.

In the example shown in FIG. 1A, the exemplary active EMI cancellation circuit 104a includes a DC blocking capacitor 120, an output inductor 122, a set of switching elements 124, and a controller 126. The DC blocking capacitor 120 is configured to block the flow of DC current from the power bus 118 to the exemplary switch mode active EMI cancellation circuit 104a, facilitating the use of lower-voltage components having a voltage rating lower compared to that power bus 118. The set of switching elements 124 is configured to switch and generate the opposing matching alternating voltage or current through the inductor 122 to cancel the ripple 109 from the power bus. The controller 126 receives a second set of control signals 128 that corresponds to those (130) that control the first set of switching elements 108 to convert the input alternating current (AC) electrical energy into the direct current (DC) electrical energy and adjust the controlling of the switching operations based on the received control signals.

In the example shown in FIG. 1B, the exemplary active EMI cancellation circuit 104b includes a coupled magnetic component 121 (e.g., transformer), an output capacitor 123, the set of switching elements 124, and the controller 126. The coupled magnetic component 121 is configured to block the flow of DC current from the power bus 118 to the exemplary switch mode active EMI cancellation circuit 104b, facilitating the use of lower-voltage components having a voltage rating lower compared to that power bus 118. The set of switching elements 124 is configured to switch and generate the opposing matching alternating voltage or current through the capacitor 123 to cancel the ripple 109 from the power bus. The controller 126 receives a second set of control signals 128 that corresponds to those (130) that control the first set of switching elements 108 to convert the input alternating current (AC) electrical energy into the direct current (DC) electrical energy and adjust the controlling of the switching operations based on the received control signals.

In other embodiments, the output inductor 122 or output capacitor 123 may be any component that develops AC voltage across it at a frequency that is desirable to filter the interference-causing object.

In some embodiments, the controller 126 is a microcontroller, an ASIC, or a set of discrete circuits distinct from the power converter that is configured to receive the control signals 128a and invert them for the cancellation. The power converter 102 may include gate drivers and various other active or passive components (not shown, see FIG. 2A). The exemplary active EMI cancellation circuit (e.g., 104a, 104b) may include similar gate drivers and/or active or passive components, so the control lines can have matching impedance and delays to the control signals (e.g., between 128 and 130). In some embodiments, the exemplary active EMI cancellation circuit (e.g., 104a, 104b) may include delay compensation components to adjust the delay on its control lines 128 so the opposing matching alternating voltage or current 117 generated at the inductor 122 (or capacitor 123) matches that (e.g., ripples 109) at the power converter inductor 112 (or at the port to the power converter or electric circuit, which can be any interference-causing circuit).

Figure 1C:
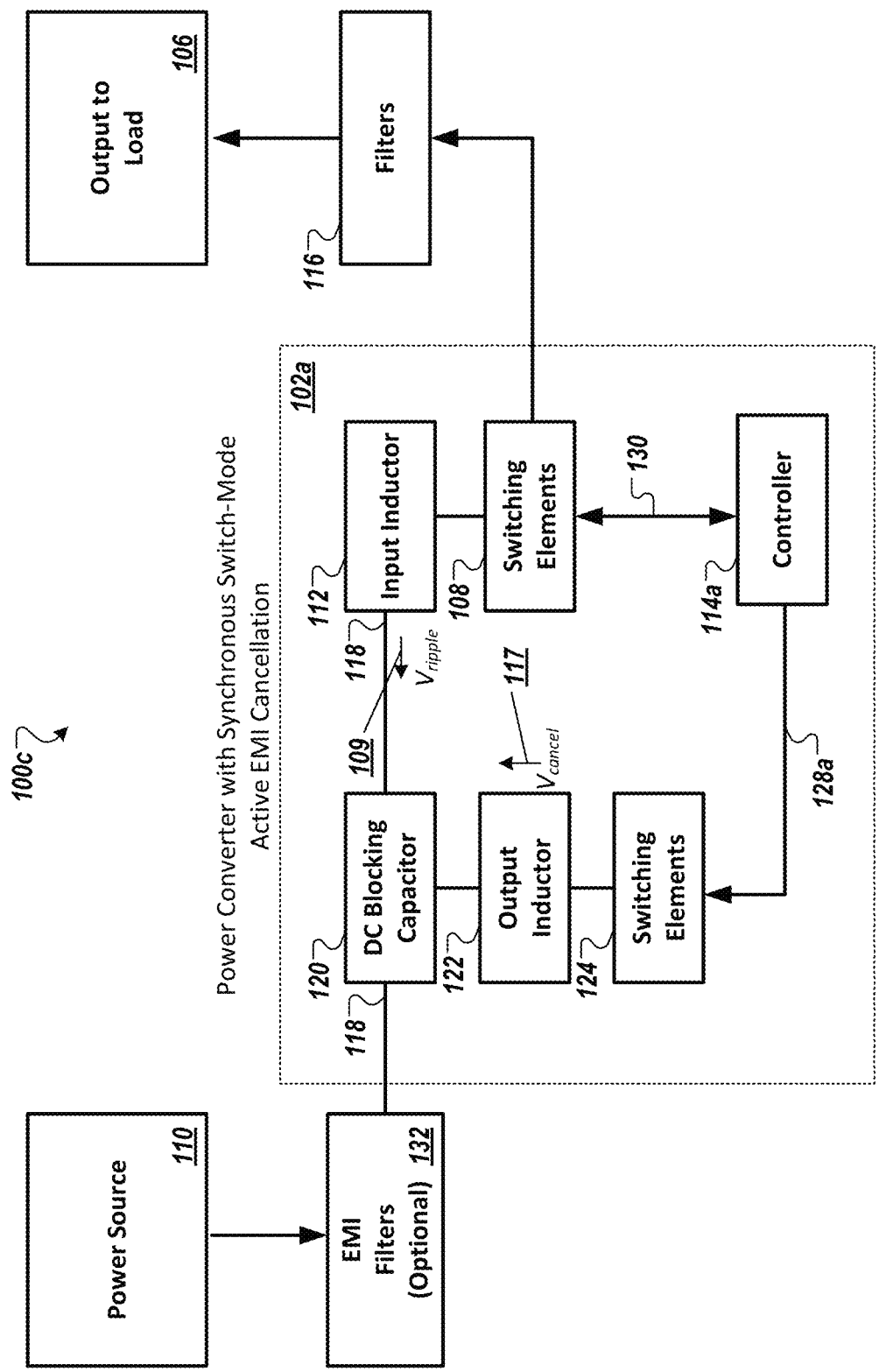
FIGS. 1C and 1D each shows an example of the power converter and the synchronous switch-mode active electromagnetic interference cancellation circuit configured as an integrated power converter system in accordance with an illustrative embodiment.
Figure 1D:
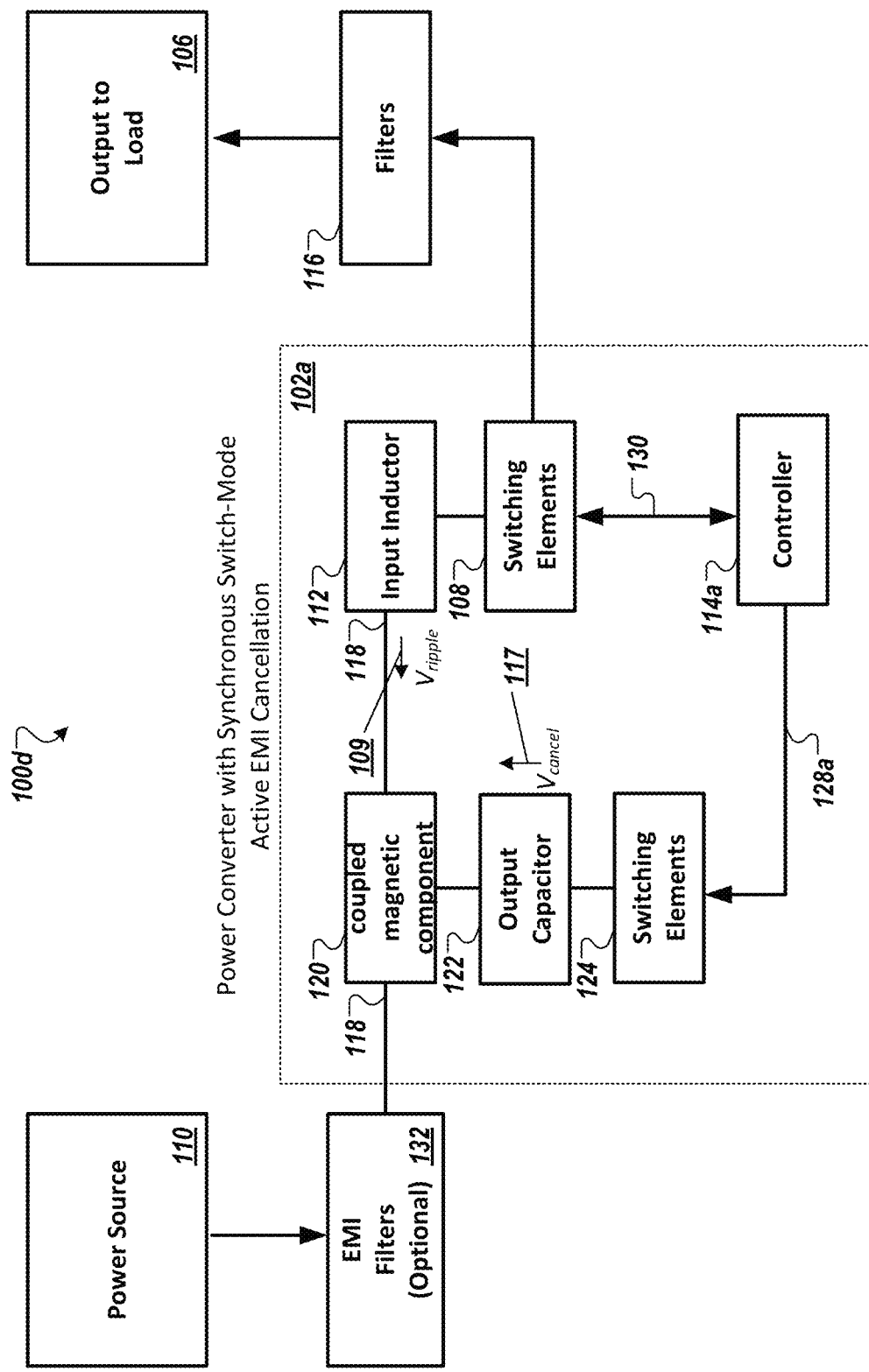

Example Integrated Power Converter with Synchronous Switch-Mode Active EMI Cancellation FIGS. 1C and 1D each shows an example of the power converter 102 and the synchronous switch-mode active electromagnetic interference cancellation circuit 104a, 104b configured as an integrated power converter system 100 (shown as 100c, 100d) in accordance with an illustrative embodiment.

In the examples shown in FIGS. 1C and 1D, the power converter controller 114 (shown as 114a) includes IO pins to output both a first set of control signals 130 to control switching of the power conversion switching elements 108 and a second set of control signals 128 (shown as 128a) to control switching of the EMI cancellation switching elements 124.

Referring to FIGS. 1A and 1B (and 1C and 1D), the synchronous switch-mode active electromagnetic interference cancellation circuit (e.g., 104a, 104b) can be configured to fully suppress or entirely remove EMI noise (e.g., to fully comply with FCC guidelines for consumer devices). In an alternative embodiment, the system 100 may include EMI filters 132 that operates in combination with the synchronous switch-mode active electromagnetic interference cancellation circuit (e.g., 104a, 104b), which can reduce a substantial portion of the EMI noise (e.g., at least 20 dB) and filtering requirements by the EMI filters 132. The EMI filters 132 may include passive EMI filters such as high-frequency LC filters or active EMI circuits comprising linear regulators.

Example Synchronous Active EMI Filter with Switch-Mode Amplifier

Figure 2A:
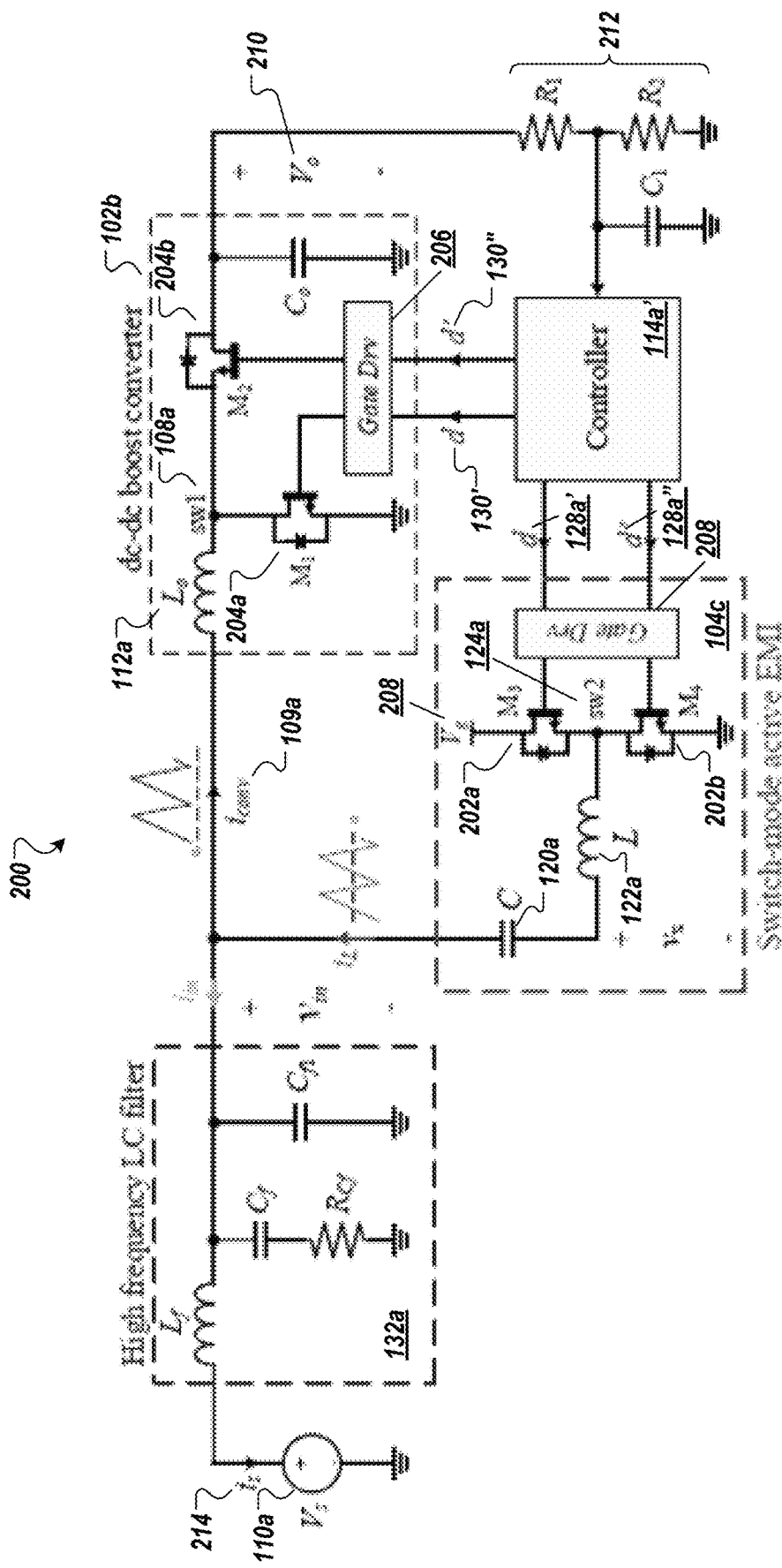
FIG. 2A shows an example implementation of a system comprising a power converter and a synchronous switch-mode active electromagnetic interference cancellation circuit in accordance with an illustrative embodiment.

FIG. 2A shows a system 200 comprising a switch-mode active EMI filter 104 (AEF) (shown as 104a) that includes switching power devices 124 (e.g., class-D switching amplifiers) (shown as "sw2" 124a) comprising MOSFETS 202 (shown as "$M_3$" 202a and "$M_4$" 202b) that are configured to synchronously operate at the same frequency and ripple to the switching power devices 108 (shown as "sw1" 108a) comprising MOSFETS 204 (shown as "$M_1$" 204a and "$M_2$" 204b) of a DC-DC boost converter 102 (shown as 102b). The output of the switching power devices 124a is connected to an output inductor 122 (shown as 122a) and a DC-blocking capacitor 120 (shown as 120a). Other topologies, e.g., as shown in FIGS. 1B and 1D, can be used. The controller 114 (shown as 114a') includes IO pins to provide (i) control signals 130 (shown as 130' and 130") to a gate driver 206 to drive the switching power devices 108a and (ii) control signals (shown as 128a' and 128a") to a second gate driver 208 to drive the switching devices 124a. Other switch components may be employed IGBT, FETS, BJTS, diodes, etc.

The synchronous switch-mode AEF circuit 104c has straightforward circuitry without many components, and that does not out require feedback and compensation circuits as a typical AEF. The synchronous switch mode employs the same duty-controlled signals (128a' and 128a") from the main power converters. The inductor 122a of the synchronous switch-mode AEF 104c has a value about 50 times smaller (for a 400V output voltage system) than that of the boost converter's inductor 112 (shown as 112a). The current attenuation can be maximized by optimizing the voltage supply, $V_g$, 208, or the inductor 122a of the AEF 104c.

The synchronous switch-mode AEF 104c can achieve very high current attenuation (e.g., over 30 dB at the fundamental frequency of 150 kHz) that suppresses the EMI noise generated by the DC-DC boost converter 102b or reduce the size of the high-frequency LC filter 132 (shown as 132a) substantially (e.g., −32 smaller) as compared to an equivalent high-frequency LC filter that is implemented alone. In the example of a 320 W DC-DC boost converter, the synchronous switch-mode AEF 104c is configured to consume power as low as 0.23 W to filter up to 30 dB of ripple current from the dc-dc boost converter.

In the example shown in FIG. 2A, the synchronous switch-mode AEF 104c may be configured as a synchronous buck converter comprising wide band-gap (WBG) GaN devices "$M_1$" 202a and "$M_2$" 202b to maximize efficiency and reduce size. The DC blocking capacitor C 120a can isolate and protect the synchronous switch-mode AEF 104c from the high-voltage bus 110 (shown as "$V_s$," 110a). The synchronous DC-DC boost converter 102b with WBG GaN devices $M_3$ 202a and $M_4$ 202b can operate in CCM (continuous common mode) or nearly BCM (boundary conduction mode) to generate an AC ripple current $i_{conv}$ 109 (shown as 109a) to cancel the ripple current of the DC-DC booster converter 102b. The synchronous switch-mode AEF 104c can operate synchronously with the DC-DCs boost converter by operating at the same switching frequency fs. An analog or digital controller may be used to regulate the output voltage $V_o$ 210 using feedback from a voltage divider circuit 212 comprising $R_1$, $R_2$, and $C_2$.

Figures 2B, 2C:
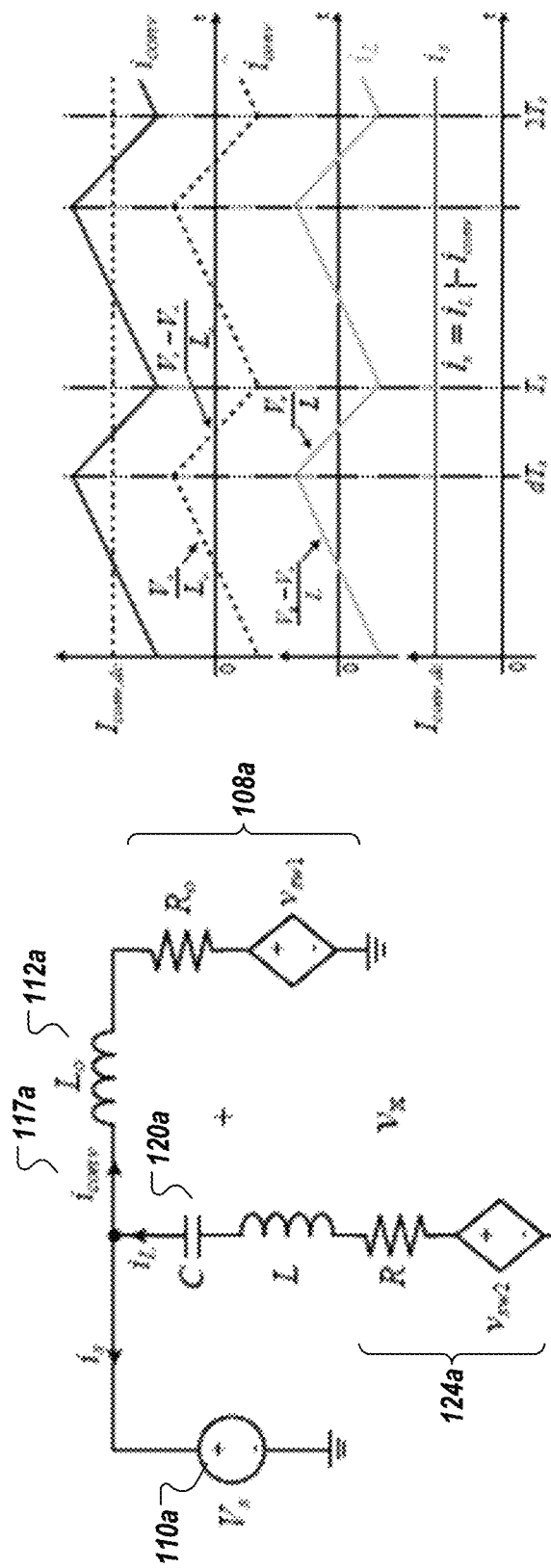
FIG. 2B shows a large-signal equivalent circuit of the synchronous switch-mode AEF of FIG. 2A.
FIG. 2C shows output waveforms of the synchronous switch-mode active electromagnetic interference cancellation circuit.

FIG. 2B shows a large-signal equivalent circuit of the synchronous switch-mode AEF 104c. FIG. 2C shows the current waveforms $i_{conv}$ 109a of the DC-DC boost converter, the current $i_L$ through the inductor 122a, and the current is (214) from the voltage source 110 (shown as 110a) at each switching interval.

In FIG. 2B, $R_o$ is the total equivalent resistance, including $r_{L_o}$ of the inductor $L_o$ and $r_{on,12}$ of $M_1$ or $M_2$ (204a, 204b); R is the total equivalent resistance including $r_C$ of the capacitor C; $r_L$ of the inductor L and $r_{on,34}$ of $M_3$ or $M_4$ (202a, 202b). It can be observed in FIG. 2C, that the switching node voltages $v_{sw1}$ and $v_{sw2}$ are both the same-frequency PWM waveforms but with opposite polarity, namely $v_{sw1}=0$ and $v_{sw2}=V_g$ for $0<t<dT_s$, and $v_{sw1}=V_o$ and $v_{sw2}=0$ for $dT_s<t<T_s$. The output voltage $V_o$ of the boost converter (e.g., operating in CCM) can be determined as $V_o=V_s/(1-d)$ where d is the average of the gating signals d' and d", and the voltage $V_x$, may be thought of as the output voltage of the AEF $V_x=dV_g$.

The capacitors $C_o$ and C can be considered to be sufficiently large so that the voltages $V_o$ and $V_x$ are constant during the switching period $T_s$ and that resistances $R_o$ and R are negligible. FIG. 2C shows the current waveforms with this consideration. If the current $i_L$ (e.g., 117, 117a) of the synchronous switch mode AEF is modulated to have the same AC ripple current as $\bar{i}_{conv}$, then the AC ripple component of $i_{conv}$ (e.g., 109, 109a) can be canceled out, and only the DC component $I_{conv,dc}$ flows through the source voltage $V_s$.

During the interval [0, $dT_s$], $M_1$ and $M_3$ are "on", $M_2$ and $M_4$ are "off," the slope of $i_{conv}$ is $V_s/L_o$ and the slope of $i_L$ is $(V_g-V_x)/L$. There is no AC ripple from $i_{conv}$ (e.g., 109, 109a) when the slopes are equal, which allows the desired inductance L (e.g., 122, 122a) to be calculated per Equation 1.

$$\frac{V_s}{L_o} = \frac{V_g - V_x}{L} \Rightarrow L = \frac{V_g}{V_o} \times L_g \tag{1}$$

The equations for the interval [$dT_s$, $T_s$] produce the same condition for L (e.g., 122, 122a). Thus L (e.g., 122, 122a) of the AEF 104c can be determined as a function of $V_g$. The current (e.g., 117, 117a) through L (e.g., 122, 122a) can be viewed as constant, so its energy storage requirement can decrease with $V_g$ (e.g., 208). If the boost output voltage is approximately 400 V, and if $V_g$ (e.g., 208) is chosen as 5V or 10 (which may be a readily available bus voltage), then the inductor L (e.g., 122, 122a) of the AEF may be determined as about 1.25-2.5% of the value (and size) of the main boost inductor $L_o$ (112a). A 1.25-2.5% sized inductor (e.g., 122, 122a) is substantially smaller than a passive EMI filter (which typically constitutes 10-30% of the total volume).

FIG. 2D shows two example converter circuits, each configured with a passive EMI filter, which may be substantially reduced using the synchronous switch-mode active electromagnetic interference cancellation circuit. In FIG. 2D, the components of the EMI filter, in particular, the capacitor, are highlighted to illustrate its size and volume with respect to the circuit. It can be clearly observed that the passive EMI filter is a substantial portion of the volume (e.g., 10-30% of the volume of the entire circuit). As noted above, the common capacitors used for EMI filters are electrolytic capacitors (because of their cost) and can vary in size (e.g., between 22.5 mm to 64 mm in diameter and 41 mm to 143 mm in length for 15 VDC to 100 VDC, respectively) based on their capacitance value and rated voltage. By substantially reducing the ripple current (e.g., 109, 109a) of the power converter (e.g., 102, 102a), via the synchronous switch-mode AEF 104c, the size of the EMI filter can be substantially reduced.

Other converter circuits may be much larger or smaller in scale, e.g., employed for utility-scale power generation and/or distribution applications or microcircuitry applications.

FIGS. 2E-2H show example implementations of the synchronous switch-mode AEF (e.g., 104a, 104b, 104c) for different power converter topologies and configurations in accordance with an illustrative embodiment.

Figure 2E:
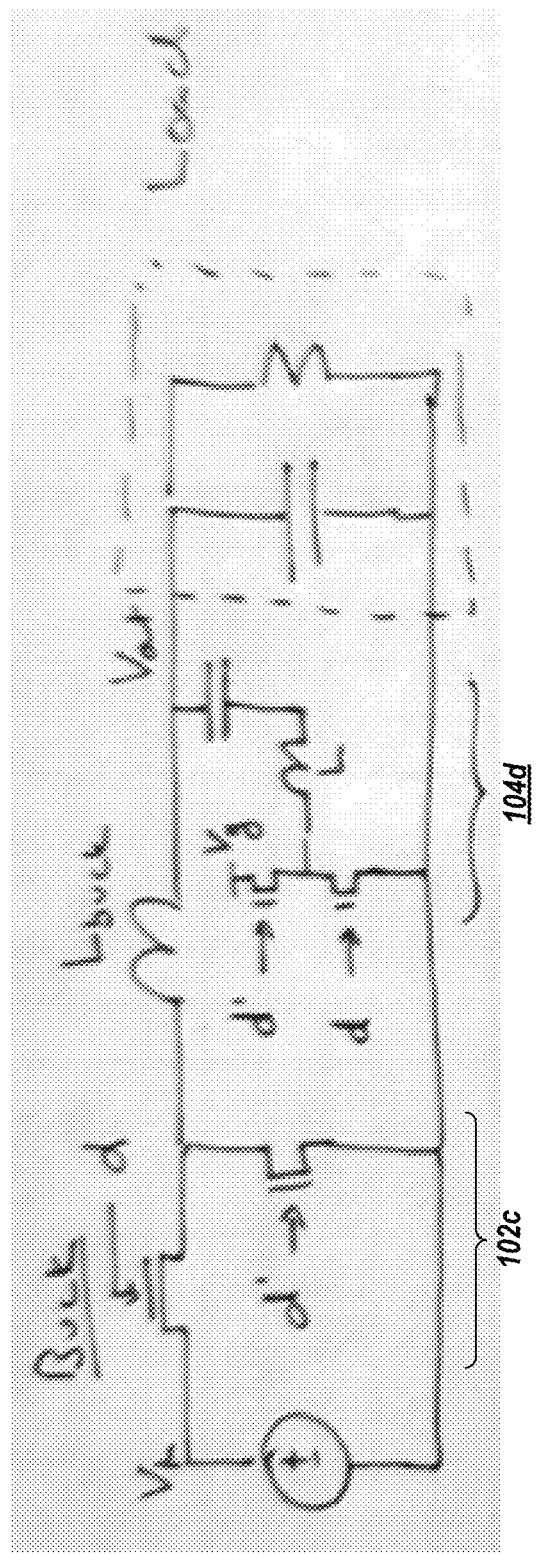
FIGS. 2E-2J show example implementations of the synchronous switch-mode AEF for different power converter topology and configuration in accordance with an illustrative embodiment.

FIG. 2E shows the synchronous switch-mode AEF of FIG. 2A being used at the output of the power converter in accordance with an illustrative embodiment. In the example shown in FIG. 2E, the power converter includes a boost converter 102 (shown as 102c) similar to that shown in FIG. 2A. The synchronous switch-mode AEF 104 (shown as 104d) is located at the output of the boost converter 102c to filter the output noise/ripples. In this configuration, $$\frac{L}{L_{buck}} = \frac{V_g}{V_{in}}.$$

Figure 2F:
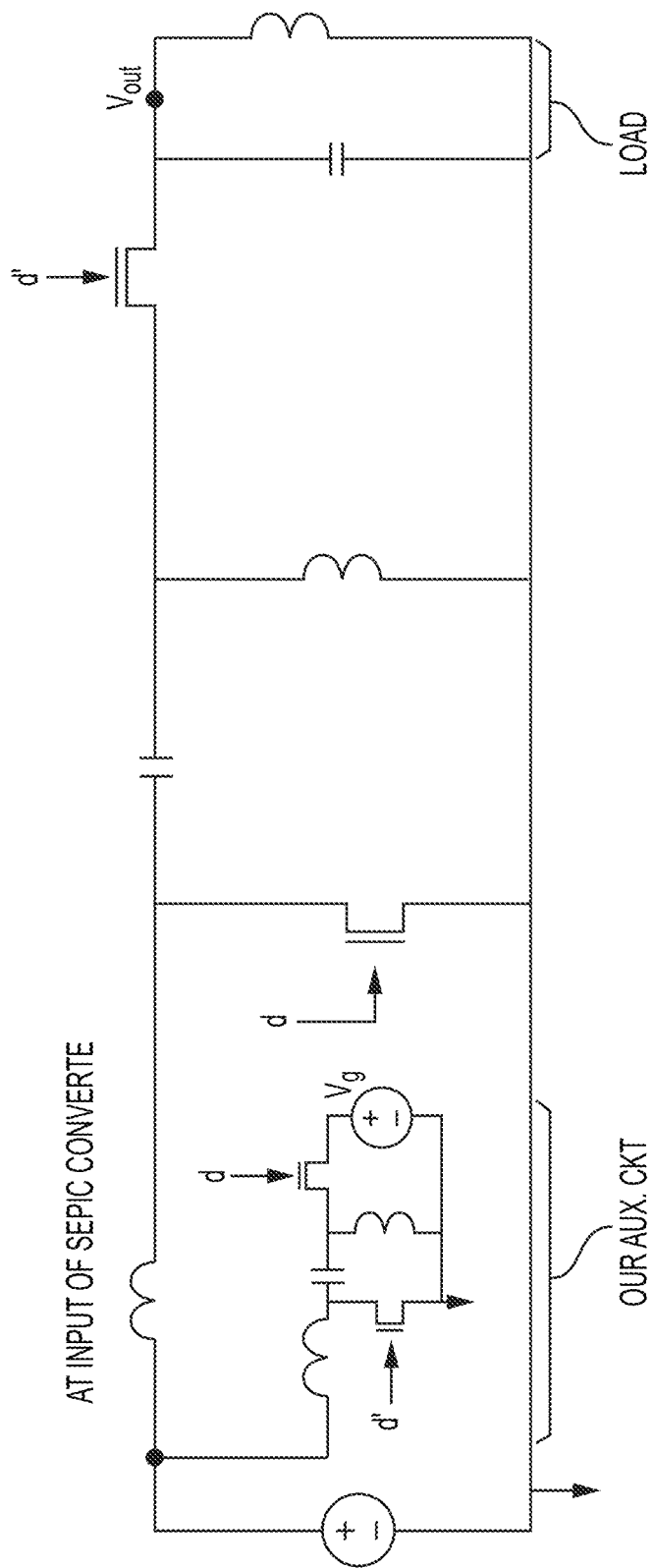

FIG. 2F shows another configuration of the synchronous switch-mode AEF of FIG. 2A, e.g., at an input of a SEPIS converter, in accordance with an illustrative embodiment. The synchronous switch-mode AEF of FIG. 2E can be considered as an auxiliary circuit rather than as a filter and is configured with the topology as the main power converter.

In alternative embodiments, the circuit topology can be reserved. For example, the synchronous switch-mode AEF, or synchronous switch-mode active auxiliary circuit, can be used as an input of a boost converter or as an output to a buck converter. The synchronous switch-mode AEF, or synchronous switch-mode active auxiliary circuit, can also be used as an input to a SEPIS converter or an output of a zeta converter.

Figure 2G:
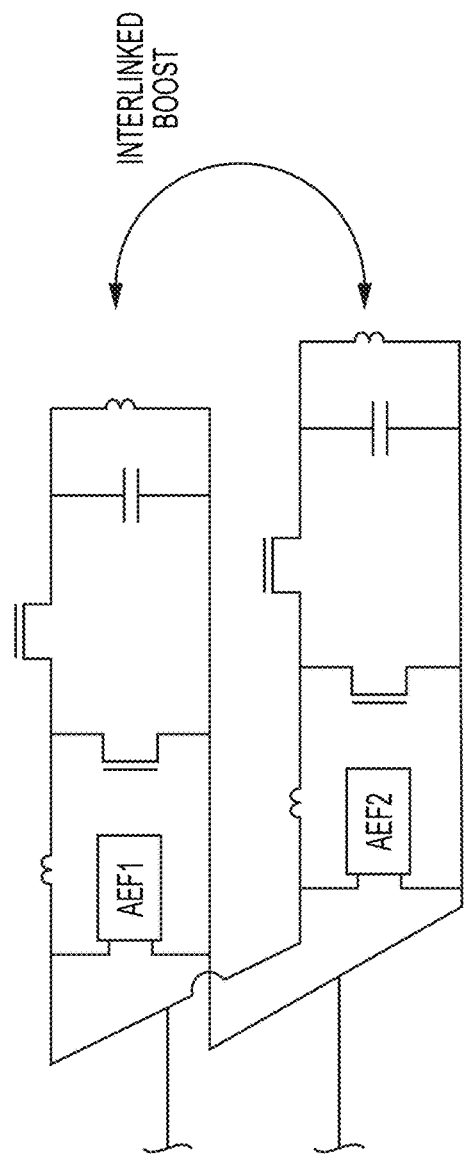

FIG. 2G shows another configuration of the synchronous switch-mode AEF for an interleaved topology converter. The configuration may include attaching an active EMI cancellation system. Interleaving is often used to control EMI but may have drawbacks. The synchronous switch-mode active AEF of FIG. 2A may render interleaving unnecessary.

Figure 2H:
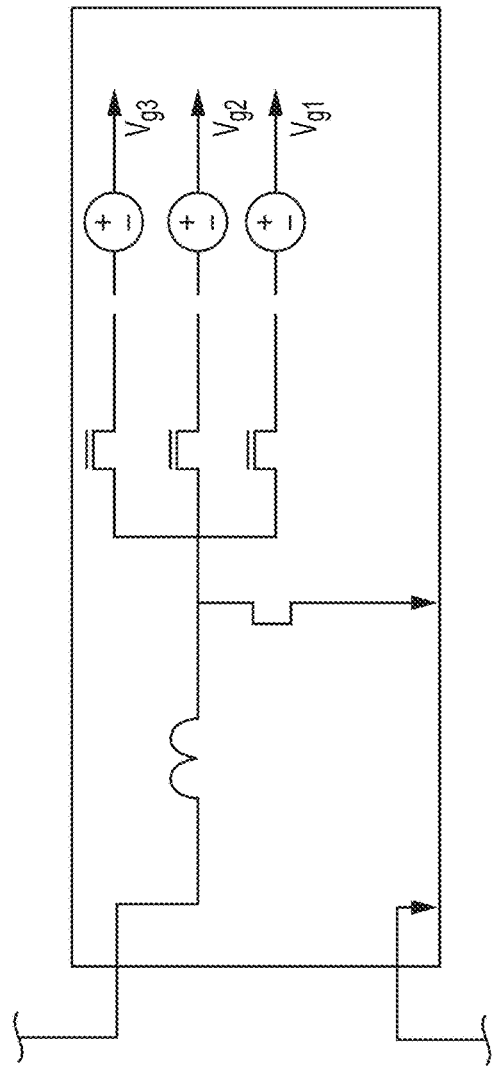

FIG. 2H shows another configuration of the synchronous switch-mode AEF. The synchronous switch-mode AEF may be employed to create one merged AEF circuit, for example, by connecting to different $V_g$'s.

Figure 2I:
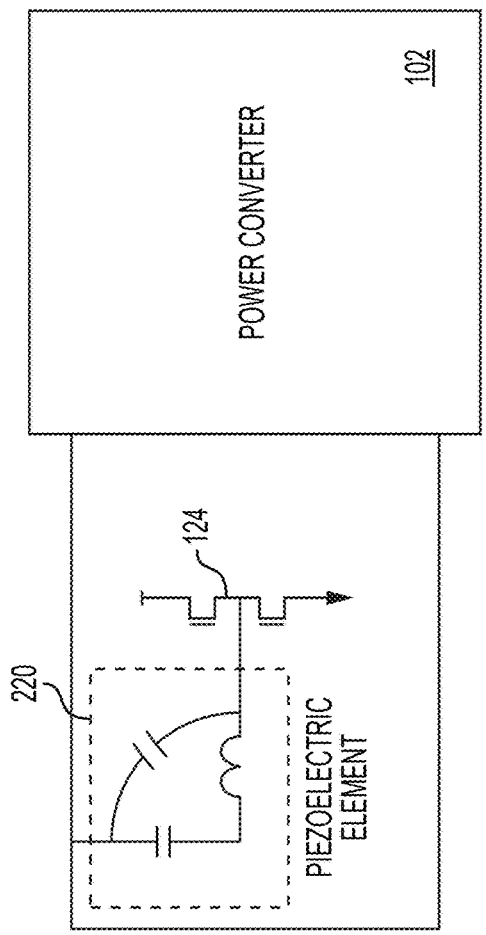

FIG. 2I shows an example implementation of the synchronous switch-mode AEF comprising an inductor formed of a piezoelectric device 220 (shown as "piezoelectric element" 220). In the example shown in FIG. 2I, the piezoelectric device has both capacitive and inductive properties and can be used to substitute for the AEF inductor and capacitor.

Figure 2J:
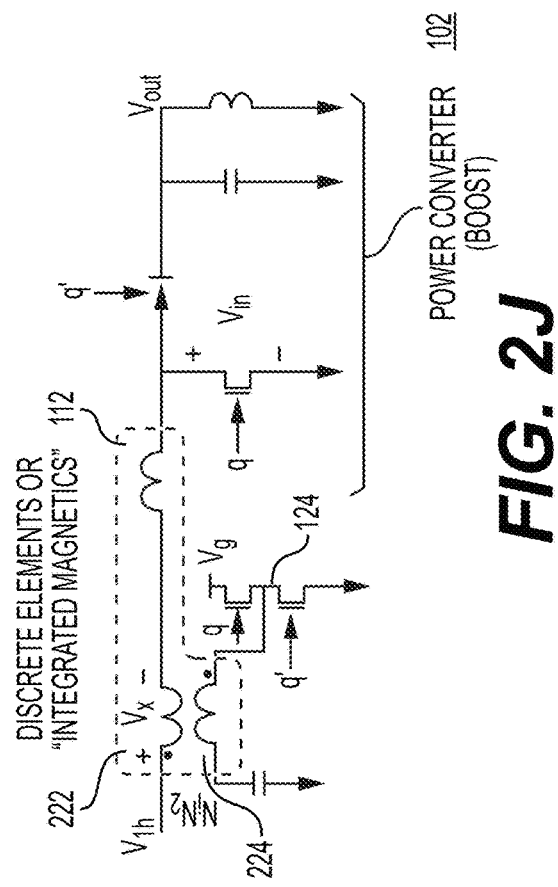

FIG. 2J shows an example implementation of the synchronous switch-mode AEF. The synchronous switch-mode AEF includes an inductor or winding 222, e.g., that is connected in series with the inductor 112 of the power converter 102. The switching elements (e.g., 124) of the synchronous switch-mode AEF are coupled to a second winding 224 that is coupled to the inductor or winding 112. The synchronous switch-mode AEF is configured to generate an AC voltage ripple across the inductor or winding 222, through the second winding 224, that is opposite to that of the second inductor 112 to cancel high-frequency voltage ripples across the inductor 112 of the power converter 102. The gating signals of the switching elements (e.g., 124) may be synchronous to that of the switching elements of the power converter, or it may be reversed based on the orientation of the windings of the inductor, which can be flipped in its connection to the power converter.

In the example of FIG. 2J, if $$V_g = \frac{N_1}{N_2} V_{out},$$

then the AC components $(\widetilde{V_{in} - V_x}) = \widetilde{V_{sw}}$ and the ripple at the input=0.

Example Method of Operation of the Synchronous Switch-Mode AEF

FIG. 3 shows an example method of operation of the synchronous switch-mode AEF (e.g., of FIGS. 1A, 1B, 1C, 1D, etc.) in accordance with an illustrative embodiment.

Method 300 includes controlling (302) switching operations of the first set of switching elements of a power converter to perform the power conversion task.

Method 300 includes controlling (304) switching operations of a second set of switching elements of a switch-mode active electromagnetic interference cancellation circuit to operatively apply an opposite alternating voltage or current at a second inductor that is coupled to an input of the first set of switching elements to cancel high-frequency ripples flowing through an inductor of the power converter.

Method 300 includes adjusting (306) the controlling of the switching operations of the second set of switching elements based on the controlling of the switching operations of the first set of switching elements.

Active EMI Filtering with Switch-Mode Amplifier for High Efficiency

In another aspect, an active EMI filter that includes a switch-mode amplifier is disclosed comprising a power converter (e.g., AC-DC converter, DC-DC converter, AC-AC converter, DC-AC converter) comprising a first set of switching elements and a first inductor located at an input to, or at an output from, the set of switching elements; and a switch-mode active electromagnetic interference cancellation circuit comprising a controller (e.g., microcontroller, ASIC, or discrete circuits), a second set of switching elements, and a second inductor located at an input to, or at an output from, the first set of switching elements, wherein the controller of the switch-mode active electromagnetic interference cancellation circuit is configured to control switching operations of the second set of switching elements based on a feedback signal that is sampled at the input to the first set of switching elements of the power converter. The first set of switching elements is configured to switch at a first harmonic frequency, and the second set of switching elements is configured to switch at a second harmonic frequency that is higher than the first harmonic frequency (e.g., at 31 MHz that is outside EMI regulated range). Operated in the VHF (30-300 MHz) range, a switching amplifier would provide vastly improved efficiency without introducing conducted EMI of its own.

Other frequency operations may be employed. For example, the system could operate the high-frequency EMI filter at 16 MHz. This would cause EMI at 16 MHz, but the harmonics would be at 32 MHz and above and would not need to be filtered. 16 MHz EMI is high-frequency and, therefore, straightforward to filter with passive components. In addition, if it's only that one frequency component you're worried about, you can even take advantage of narrow-band filtering to knock that out.

Figure 4A:
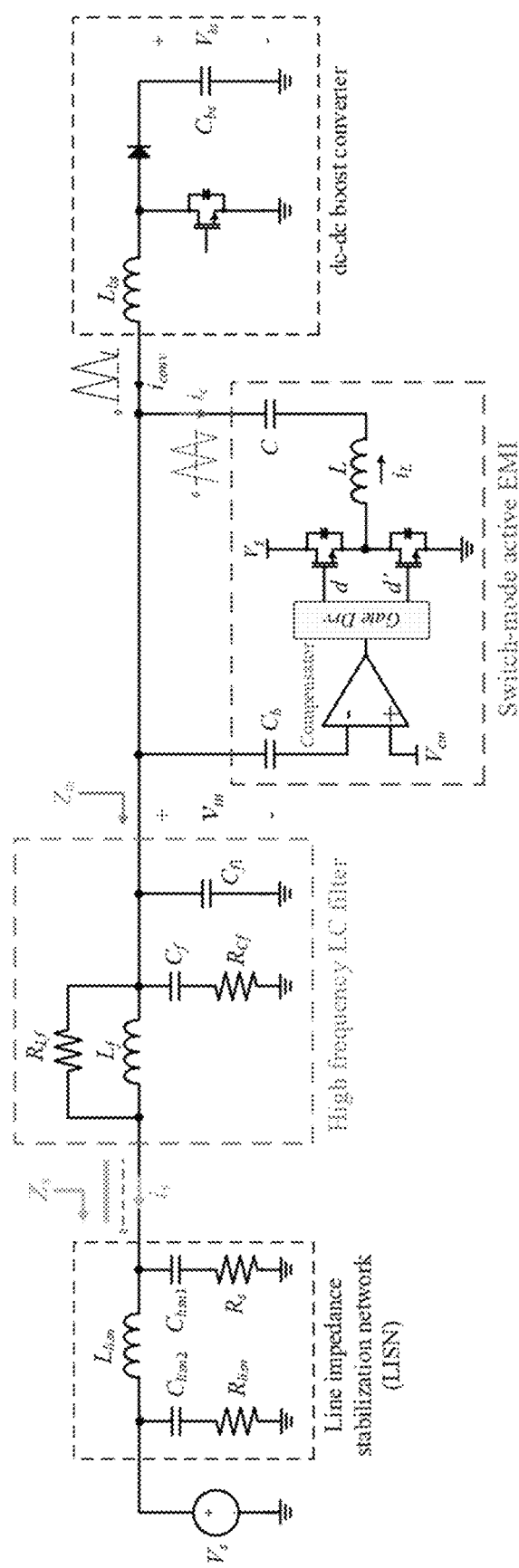
FIG. 4A shows a diagram of an example active EMI filtering system with high-frequency switch-mode amplifier operation in accordance with an illustrative embodiment.

FIG. 4A shows a diagram of an example active EMI filtering system with high-frequency switch-mode amplifier operation in accordance with an illustrative embodiment. The switching amplifier of the proposed AEF operates at 31 MHz to keep its own EMI out of the regulated EMI range. The system can use fractional-order filtering in the compensation loop to achieve high loop gain and, thus, high current attenuation. In the example shown in FIG. 4A, the high-frequency switch-mode AEF is designed for a boundary conduction mode (BCM) boost converter operated at 150 kHz. Simulation and experimental results show 30 dB attenuation performance from the active circuit at the boost fundamental frequency while consuming only 1 W for 120 W output power.

FIG. 4B shows an example method 400 of operation of the high-frequency switch-mode AEF in accordance with an illustrative embodiment. Method 400 includes controlling (402), via circuitry or instructions, switching operations of a set of switching elements of a switch-mode active electromagnetic interference cancellation circuit to generate a high-frequency opposing alternating voltage or current (e.g., greater than 30 MHz) at an inductor that is coupled to an input of a power converter. Method 400 includes receiving (404) a feedback signal sampled at the input to the set of switching elements of the power converter. Method 400 includes adjusting (406) the controlling of the switching operations based on the received control signals.

Figure 4C:
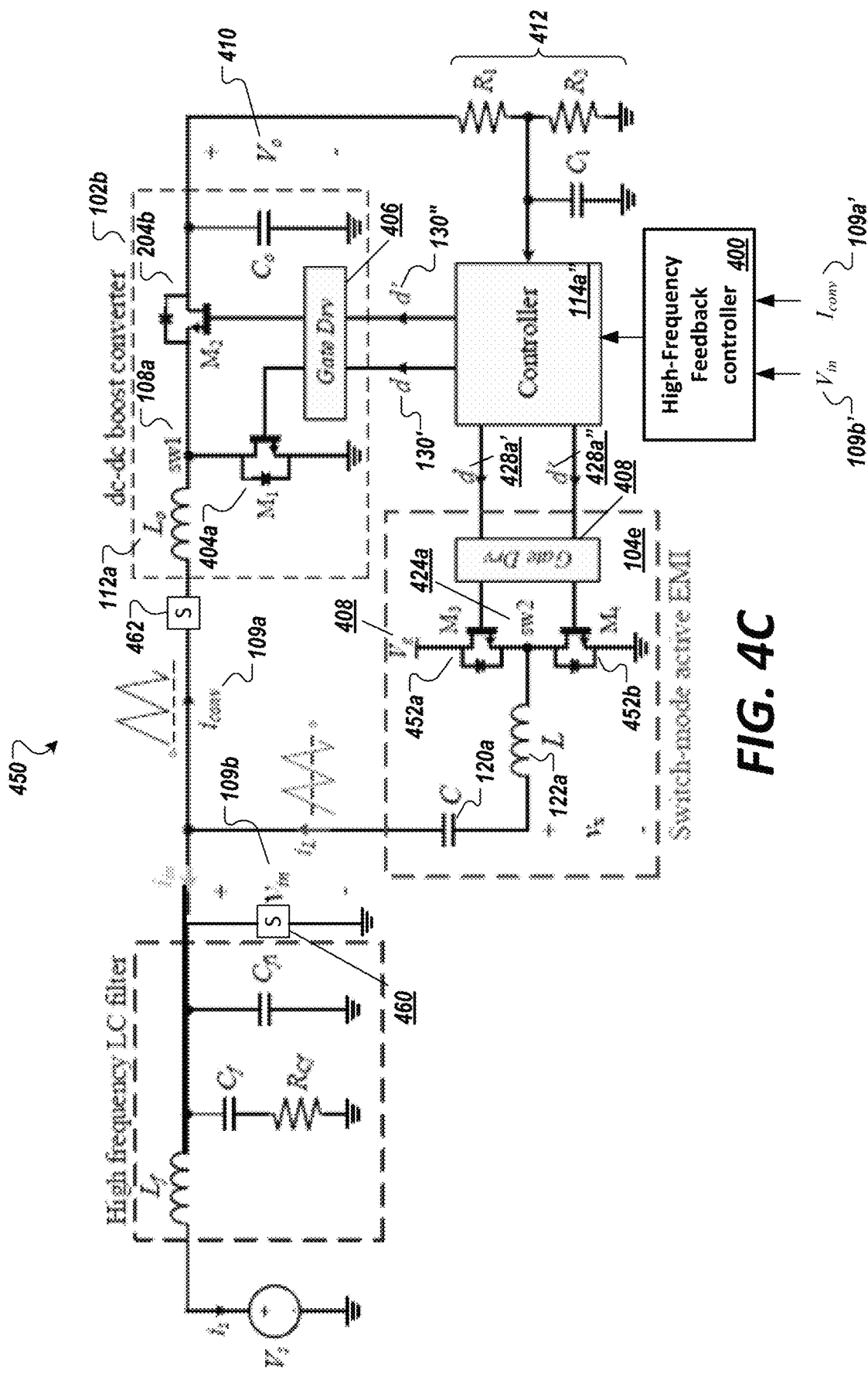
FIG. 4C shows an example method of operation of the high-frequency switch-mode AEF in accordance with an illustrative embodiment.

FIG. 4C shows a system 450 comprising the switch-mode active EMI filter 104e of FIG. 2A configured for high-frequency operation beyond that of the ripple or noise generated by the switching power devices 108 (shown as "sw1" 108a) comprising MOSFETs 452 (shown as "$M_1$" 452a and "$M_2$" 452b) of a DC-DC boost converter 102 (shown as 102b). The output of the switching power devices 424a is connected to an output inductor 122 (shown as 122a) and a DC-blocking capacitor 120 (shown as 120a). Other topologies, e.g., as shown in FIGS. 1B and 1D, can be used. The controller 114 (shown as 114a") includes IO pins to provide (i) control signals 130 (shown as 130' and 130") to a gate driver 206 to drive the switching power devices 108a and (ii) control signals (shown as 428a' and 428a") to a second gate driver 208 to drive the switching devices 124a.

The system 450 includes a high-frequency feedback controller 452 configured to measure, e.g., via sensors 460 and 462, the AC ripple current $i_{conv}$ 109a (shown as 109a') and the voltage input 109b (shown as 109b'), respectively. Using standard feedback control operations, the high-frequency feedback controller 452 in a separate control loop can adjust the output duty cycle of the high-frequency switching switches 454a, 454b, via commands 428a' and 428a", s to adjust the average current through inductor 122a to cancel the current AC ripple $I_{conv}$ 109a.

Additional Examples

FIGS. 6A and 6B each shows an example of electric circuit ports connected to a synchronous or high-frequency switch-mode active electromagnetic interference cancellation circuit (e.g., 100, 100a, 100b, 100c, 100d, 100e, etc.) in accordance with an illustrative embodiment. In the example shown in FIG. 6A, the synchronous or high-frequency switch-mode active electromagnetic interference cancellation circuit (shown as "Switch-Mode EMI Filter") is configured to generate a current to cancel noise or interference emanating from a noisy or interference-causing port connected to a noisy electric circuit (shown as "noisy object") so the interference or noise does not propagate to an interference-free port connected to an interference-free circuit or component (shown as "Quiet Object").

In the example shown in FIG. 6B, the synchronous or high-frequency switch-mode active electromagnetic interference cancellation circuit (shown as "Switch-Mode EMI Filter") is configured to generate a voltage to cancel noise or interference emanating from the noisy or interference-causing port connected to the noisy electric circuit (shown as "noisy object") so the interference or noise does not propagate to an interference-free port connected to an interference-free circuit or component (shown as "Quiet Object").

Examples are apparatuses represented in FIGS. 6A and 6B are shown above via FIGS. 1A, 1B, 1C, 1D, 2A, 2B, 2C, 2D, 2E, 2F, 2G, 2H, 4A, 4B, and 4C.

Examples of interference-free circuits or components include, but not limited to, microprocessor boards and/or associated components, analog-to-digital converter boards and/or associated components, digital-to-analog converter boards and/or associated components, digital communication boards and/or associated components, network communication boards and/or associated components, energy storage components or equipment, power generation components or equipment, among others described or referenced herein.

Additional embodiments, according to FIGS. 6A and 6B, are provided in which:

Embodiment #1. An Apparatus Comprising:

at least three electrical ports, including an interference-free port, an interference-causing port, and an EMI filter port, wherein each of the at least three electrical ports (defined as in the engineering literature) comprises a pair of electrical conductors in which the current in one conductor is always equal and opposite to the current in the other conductor, wherein the interference-causing port is connected to an interference-causing component or circuit that causes current to flow or voltage to appear at the interference-causing port at frequencies and magnitudes which would be undesirable to appear at the interference-free port, wherein the interference-free port is connected to a component or circuit which, by scientific and engineering principles or by regulation, is required to experience small currents or voltages at certain frequencies;

an EMI filter comprising a set of switching elements or circuit (e.g., that can be operated substantially as electrical switches, e.g., MOSFETs, diodes, etc.), henceforth referred to as the switching elements of the EMI filter, wherein the component connected to the EMI filter port (the EMI filter) which, by its operation, causes current to flow or voltage to appear at its port that either approximately or exactly matches the interference current/voltage generated by the object connected to the interference-causing port at the frequencies that are undesirable for the quiet port;

an interconnection among the three ports that allows the EMI filter port current/voltage to cancel the interference port current/voltage such that the quiet port experiences either exactly or approximately zero current/voltage at one or more of the frequencies that are undesirable; and a controller (e.g., of the interference-causing object or a separate controller) that is operatively coupled to the switching elements of the EMI filter to control switching operations of these switching elements to create an alternating voltage or current at the EMI port, which approximately or exactly is equal in magnitude and opposite in polarity to the interference signal (e.g., opposite in magnitude or 180-degree offset) at one or more frequencies.

Embodiment #2. The apparatus of Embodiment 1, wherein the interference-causing object is a power converter (e.g., AC-DC converter, DC-DC converter, AC-AC converter, DC-AC converter)

Embodiment #3. The apparatus of any of Embodiments 1-2, wherein the EMI filter comprises a DC blocking capacitor or coupled-magnetic component (e.g., transformer) to connect the EMI filter to the EMI filter port, wherein current is injected into the EMI filter port to cancel current from the interference-causing port.

Embodiment #4. The apparatus of any of Embodiments 1-2, wherein the EMI filter comprises a transformer or other coupled magnetic component to connect the EMI filter to the EMI filter port, wherein a voltage is injected at the EMI filter port to cancel voltage from the interference-causing port.

Embodiment #5. The apparatus of Embodiment 3 and/or 4 wherein the voltages and/or currents that are applied to the remaining components of the EMI filter are substantially lower or higher than the voltages or currents at any of the three ports.

High-Frequency Embodiments

Embodiment #6. The apparatus of any of Embodiments 1-5, wherein the controller is configured to control switching operations of the switching elements (e.g., FIGS. 4A-4C) of the EMI filter at a frequency not equal, or substantially higher, to the frequency/frequencies that need to be filtered from the interference-causing port.

Embodiment #7. The apparatus of Embodiment 6 in which the switching frequency of switches of the EMI filter is configured to operate at a frequency at which the quiet port voltage or current is unregulated or a frequency that can be passively filtered with small size and high efficiency.

Embodiment #7a. The apparatus of Embodiment 6 or 7, wherein the interference-causing port outputs interference or ripples at a first harmonic frequency, and wherein the EMI filter is configured to switch at a second harmonic frequency, wherein the second harmonic frequency is higher than the first harmonic frequency.

Embodiment #7b. The apparatus of Embodiment 7a, wherein the second harmonic frequency is higher than 31 MHz (i.e., outside EMI regulated range).

Synchronous Embodiments

Embodiment #8. The apparatus of any of Embodiments 1-5, wherein the interference-causing object comprises a set of switching elements, hereafter known as the interference-causing switches.

Embodiment #9. The apparatus of Embodiment 8 wherein the controller is configured to control switching operations of the switching elements of the EMI filter based on control signals that control the switching elements of the interference-causing object.

Embodiment #10. The apparatus of Embodiment 9, wherein the interference-causing object comprises an inductor in series with the interference-causing port.

Embodiment #11. The apparatus of Embodiment 10, wherein the interference-causing object is a power converter configured as at least one of a boost converter, a single-ended primary-inductor converter (SEPIC), a Cuk converter, a boost converter and an interleaved combination of any of these.

Embodiment #12. The apparatus of any of Embodiments 9-11, wherein the EMI filter further comprises a capacitor connected to either terminal of the EMI filter port and an inductor in series with this capacitor.

Embodiment #13. The apparatus of Embodiment 12 wherein the alternating voltage applied to the EMI filter inductor divided by its inductance is approximately or exactly equal and opposite to the alternating voltage applied to the interference-causing object's inductor divided by its inductance such that the two inductor currents change at approximately or exactly the same rate and the resulting alternating current in the quiet port is approximately or exactly zero.

Embodiment #14. The apparatus of Embodiment 9, wherein the interference-causing object comprises a capacitor in parallel with the interference-causing port.

Embodiment #15. The apparatus of Embodiment 14, wherein the EMI filter comprises a coupled magnetic component with one winding connected in parallel with the EMI filter port and a capacitor in parallel with the second winding.

Embodiment #16. The apparatus of Embodiment 15 wherein the alternating current applied to the EMI filter capacitor divided by its capacitance is approximately or exactly equal and opposite to the alternating current applied to the interference-causing object's capacitor divided by its capacitance such that the two capacitor voltages change at approximately or exactly the same rate and the resulting alternating voltage at the quiet port is approximately or exactly zero.

Embodiment #17. The apparatus of any of Embodiments 1-17, further comprising a passive electromagnetic interference (EMI) filter, e.g., a high-frequency LC filter, and/or an active EMI filter comprising a linear amplifier.

Embodiment #18. The apparatus of any of Embodiments 1-17, wherein the EMI filter comprises a piezoelectric device having both inductive and capacitive properties.

Embodiment #19. A system (e.g., laptop, mobile/smartphone) comprising:
 a switch-mode active electromagnetic interference cancellation circuit of the apparatus of any one of Embodiments 1-18.

Embodiment #20. A method to filter EMI of an electric circuit, the method comprising:
 providing the electric circuit comprising at least three electrical ports, including an interference-free port, an interference-causing port, and an EMI filter port, wherein each of the at least three electrical ports comprises a pair of electrical conductors in which the current in one conductor is always equal and opposite to the current in the other conductor, wherein the interference-causing port is connected to an interference-causing component or circuit that causes current to flow or voltage to appear at the interference-causing port at frequencies and magnitudes which would be undesirable to appear at the interference-free port, wherein the interference-free port is connected to a component or circuit) which is required to experience small currents or voltages at certain frequencies; and
 controlling, via circuitry or instructions, switching operations of a second set of switching elements or components of a switch-mode active electromagnetic interference cancellation circuit to operatively apply an opposite alternating voltage or current at the EMI filter port to cancel high-frequency ripples flowing through the interference-causing port.

Embodiment #21. The method of Embodiment 20, wherein the switching operations of the second set of switching elements or components are at a frequency range (e.g., greater than 31 MHz) outside a defined EMI range.

Embodiment #22. The method of Embodiment #21, further comprising:
 receiving a feedback signal sampled at the input to the first set of switching elements of the power converter; and
 adjusting the controlling of the switching operations based on the received feedback signal.

Embodiment #23. A method to filter the EMI of an electric circuit configured to perform a power conversion or switching task (e.g., changing voltage and/or current, changing frequency (in the case of ac/ac), charging an energy storage device such as a battery, drawing maximum power from a source or depositing maximum power to a load), the method comprising:

provide the electric circuit comprising at least three electrical ports, including an interference-free port, an interference-causing port, and an EMI filter port, wherein each of the at least three electrical ports comprises a pair of electrical conductors in which the current in one conductor is always equal and opposite to the current in the other conductor, wherein the interference-causing port is connected to an interference-causing component or circuit that causes current to flow or voltage to appear at the interference-causing port at frequencies and magnitudes which would be undesirable to appear at the interference-free port, wherein the interference-free port is connected to a component or circuit) which is required to experience small currents or voltages at certain frequencies;

controlling, via circuitry or instructions, switching operations of the interference-causing component or circuit to perform the power conversion or switching task that provides output to the interference-causing port;

controlling, via circuitry or instructions, switching operations of a second set of switching elements of a switch-mode active electromagnetic interference cancellation circuit to operatively apply an opposite alternating voltage or current at the EMI port to cancel high-frequency ripples flowing from the interference-causing port; and adjusting the controlling of the switching operations of the second set of switching elements based on the controlling of the switching operations of the interference-causing component or circuit.

Embodiment #24. The method of Embodiment 23, wherein the electric circuit is configured as a power converter, wherein the power converter is configured as at least one of a buck-boost converter, a single-ended primary-inductor converter (SEPIC) converter, a Cuk converter, a boost converter, and an interleaved boost converter.

Embodiment #25. The method of any one of Embodiments 20-23, wherein the switch-mode active electromagnetic interference cancellation circuit is coupled to the interference-causing port through a DC blocking capacitor or a coupled-magnetic component (e.g., transformer).

Embodiment #26. The apparatus of any one of Embodiments 20-25 wherein the EMI port outputs an opposite voltage or current and at a same voltage or current level to that of the interference-causing port to cancel electromagnetic interference generated at the interference-causing port.

Embodiment #27. The apparatus of any one of Embodiments 20-25, wherein the EMI port outputs an opposite voltage or current at a low or higher voltage or current level to that of the interference-causing port to cancel a part of the electromagnetic interference generated at the interference-causing port.

Embodiment #28. The method of any one of Embodiments 20-27, wherein the electric circuit is a power converter, wherein power converter includes a passive electromagnetic interference (EMI) filter, a high-frequency LC filter, and/or an active EMI filter based on a linear amplifier.

Embodiment #28. The method of any one of Embodiments 22-27, wherein the second set of switching elements or components of the switch-mode active electromagnetic interference cancellation circuit is located at the input to the interference-causing port.

Embodiment #30. The method of any one of Embodiments 20-27, wherein the second set of switching elements or components of the switch-mode active electromagnetic interference cancellation circuit is located at the output of the interference-causing port.

Experimental Results and Additional Examples

Figure 5A:
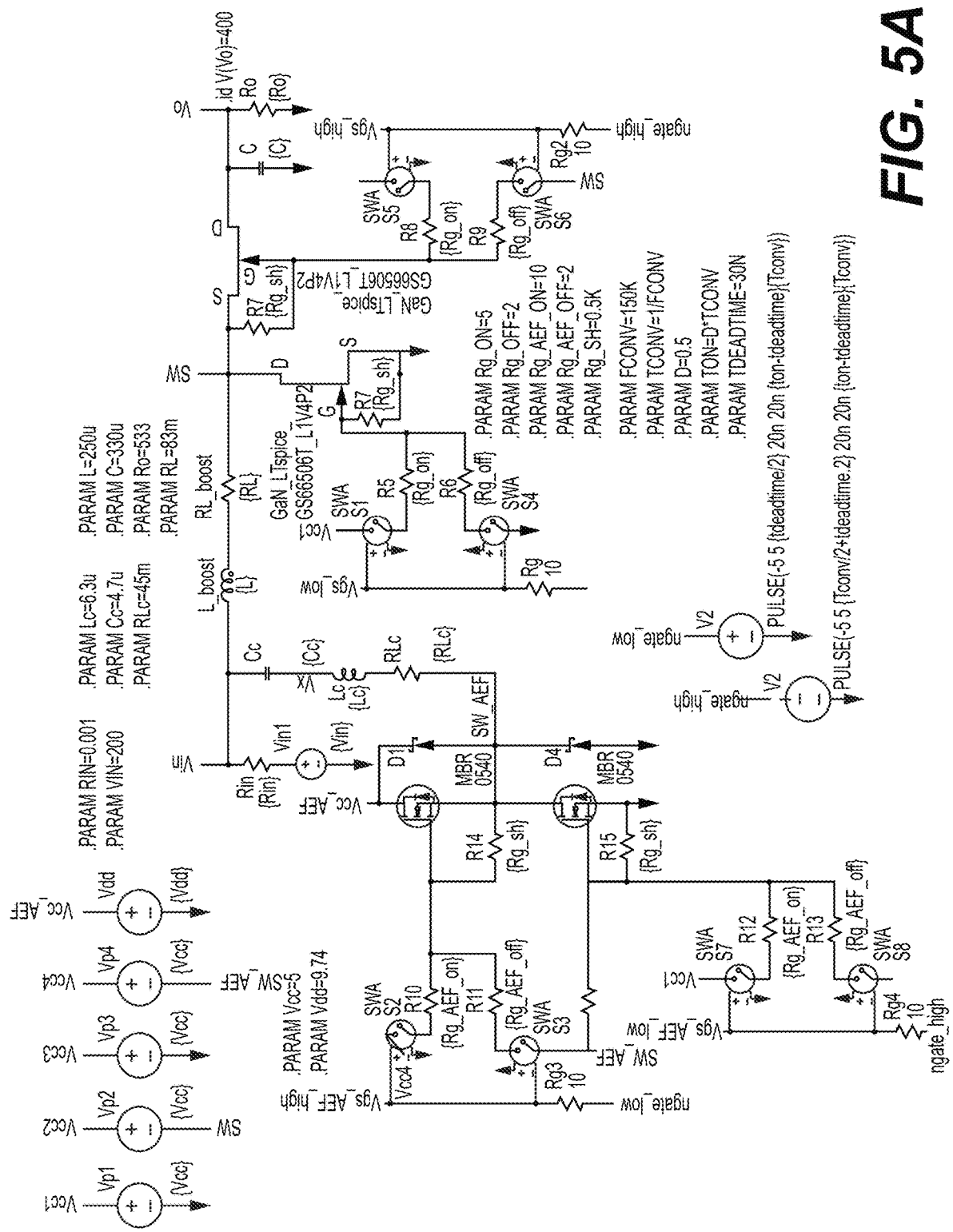
FIG. 5A shows a schematic of a simulation of the synchronous switch-mode AEF.

A prototype was developed for the exemplary switch mode active EMI cancellation circuit. FIG. 5A shows a schematic of a simulation of the synchronous switch-mode AEF. The simulation was set up in LTSPICE and shows the operation of the switching elements $M_1$ and $M_2$ of the power converters and the switching elements $M_3$ and $M_4$ of the switch-mode active EMI cancellation circuit. The power converter includes an inductor $L_{bs}$ that is coupled to the output of the switch-mode active EMI cancellation circuit through an inductor L and a DC-block capacitor C.

Figure 5B:
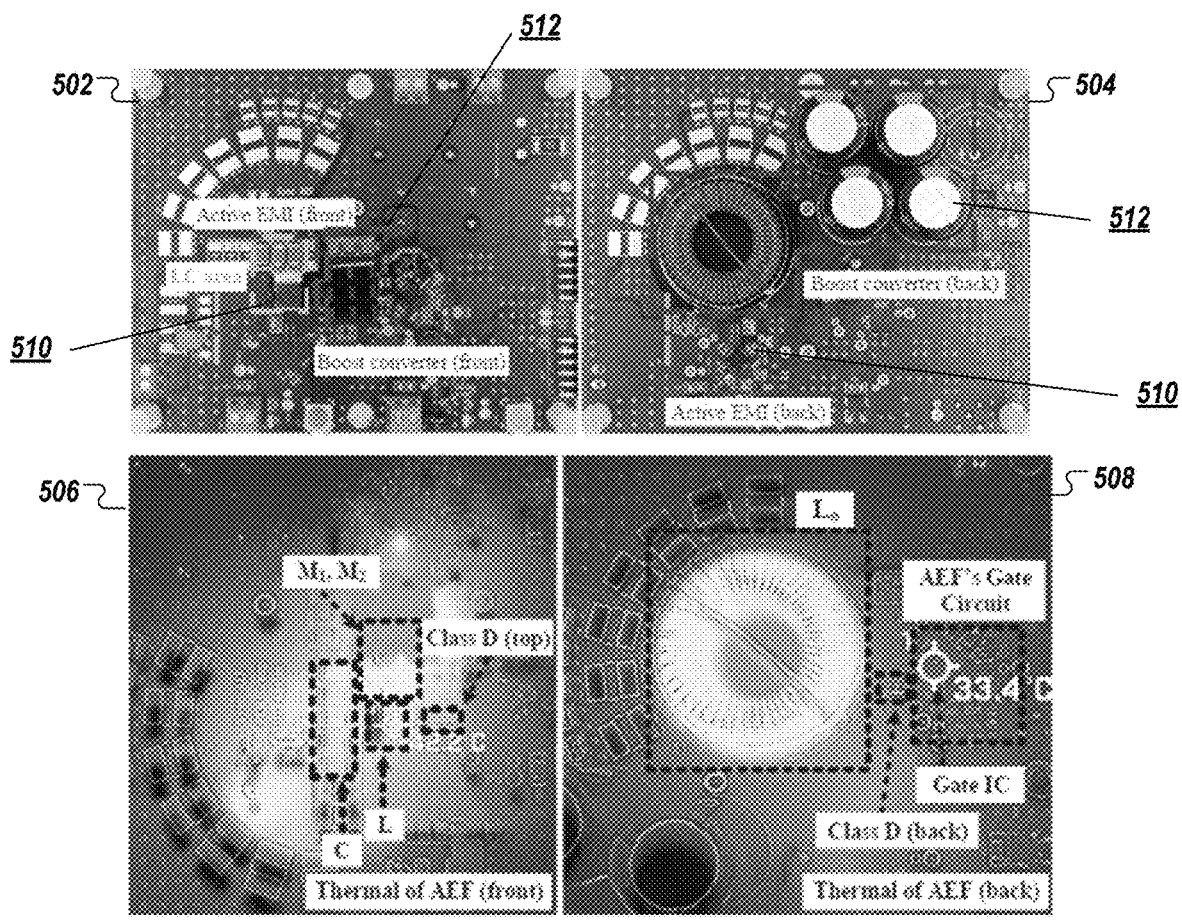
FIG. 5B shows a fabricated prototype of the synchronous switch-mode AEF.

FIG. 5B shows a fabricated prototype of the synchronous switch-mode AEF. In FIG. 5B, the top view (502) and bottom view (504) of the prototype are shown. FIG. 5B also shows the thermal performance of the fabricated prototype (top view, 506; bottom view, 508). It can be observed that the synchronous switch-mode AEF (510) occupies a very small area of the whole power converter with a 320 W DC-DC boost converter (512) operating in CCM or nearly BCM for generating a large ripple current to filter. The DC-DC converter was designed to operate at 150 kHz (i.e., the lower limit of the conducted EMI range) even though the current attenuation is independent of the switching frequency. The inductor $L_o$ of the boost converter has a value of 240 pH at 200V input voltage and 400V output voltage. The synchronous switch-mode AEF has a supply voltage $V_g$ that employs an existing voltage supply for the gate driver circuit, which is usually between 5V to 10V. Thus, the inductor L calculated from Eq. 1 is ~4.7 μH for optimizing the current attenuation. The voltage supply $V_g$ was tuned in an open-loop experiment to maximize the current attenuation against parasitics and ringing of the boost converter.

Figure 5C:
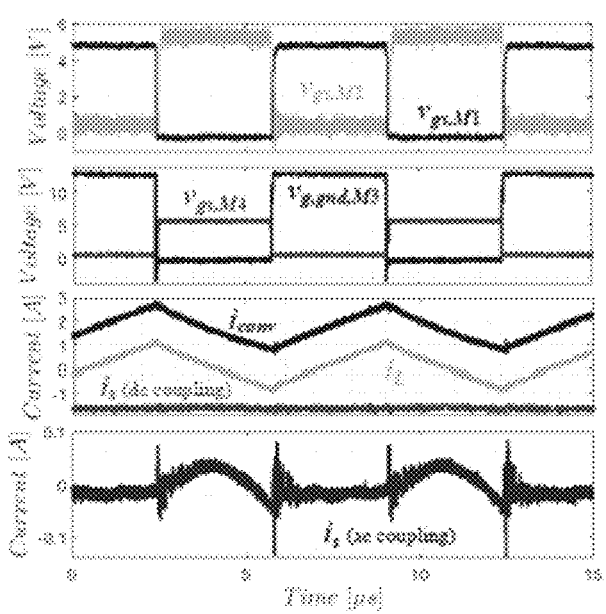
FIGS. 5C and 5D show experimental results of the fabricated prototype of the synchronous switch-mode AEF of FIG. 5B.
Figure 5D:
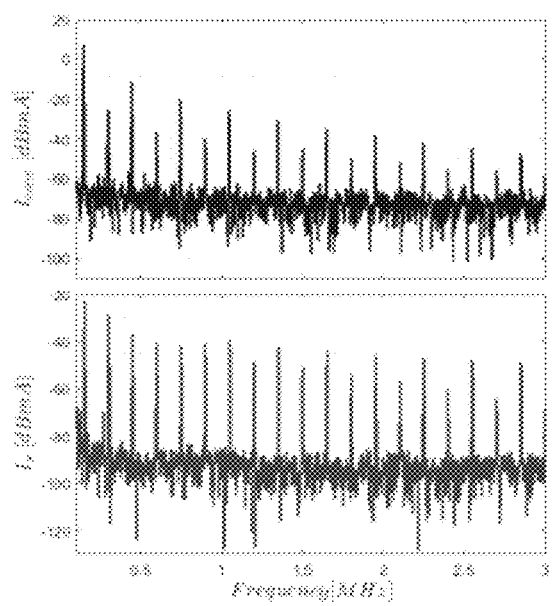

FIGS. 5C and 5D show experimental results of the fabricated prototype of the synchronous switch-mode AEF of FIG. 5B.

In FIGS. 5C and 5D, open-loop test results are shown at 320 W output power with the switching duty cycle equal to 0.5 for Vs=200V and Vo=400V in which $M_1$ and $M_3$, and $M_2$ and $M_4$ are synchronized in each switching interval. The synchronous switch-mode AEF was observed to achieve a very high current attenuation of over 71 dB at the fundamental frequency of 150 kHz and C=4.7 μF. The attenuation was limited in the experiment by second-order effects from finite C; thus, higher attenuation is available by increasing the size of the (small) capacitor C as well by minimizing the large switching ringing of the boost converter.

The synchronous AEF consumed only 0.23 W for 320 W output power, including 0.22 W from the power circuit and 0.01 W from the gate drive circuit, which makes it very comparable with the conventional passive LC filter but having a much smaller size. A thermal image in FIG. 5B shows very low temperatures on all components of the AEF, where the highest temperature is less than 43° C. on the inductor L, which demonstrated that the synchronous switch-mode AEF could be employed as a replacement for either conventional passive LC or linear-mode active EMI filters while providing for smaller size form factor and higher efficiency.

Additional experimental results and examples of the synchronous switch-mode AEF is provided in D. T. Nguyen, C.

Deng, E. Macias, and A. J. Hanson, "Synchronously Switched Active EMI Filter," 2022 IEEE Energy Conversion Congress and Exposition (ECCE), Detroit, MI, USA, 2022, pp. 1-8, which is incorporated by reference in its entirety.

Additional experimental results and examples of the high-frequency switch-mode AEF is provided in D. T. Nguyen, E. Macias, and A. J. Hanson, "Active EMI Filter with Switch-Mode Amplifier for High Efficiency," 2022 IEEE Applied Power Electronics Conference and Exposition (APEC), Houston, TX, USA, 2022, pp. 443-450, which is incorporated by reference in its entirety.

Discussion Conducted electromagnetic interference (EMI) in the regulated range of 0.15 MHz to 30 MHz is a major concern when designing switch-mode power supplies (SMPS), and conventional passive LC filters [1] can occupy up to ~⅓ of the whole power supply volume. It has been proposed to replace or supplement passive EMI filters with active EMI filters (AEF), which typically consist of linear amplifiers in a feedback loop that measures and suppresses interference [2], [3]. One possible AEF configuration is to sense the ripple voltage, amplify the signal through a linear amplifier, and inject current into the network to eliminate the input ripple. This approach provides high current attenuation with a significantly reduced size of the filter, but because its operation is dependent on feedback, it can achieve limited attenuation over a limited bandwidth to maintain stability. In addition, it has very high power losses due to the linear amplifier. Because these losses scale with the maximum current that needs to be filtered, previous AEF works have primarily focused on filtering for deep continuous conduction mode (CCM) converters with low input ripple or filtering common-mode interference.

An AEF that replaced the linear amplifier with a switch-mode amplifier was introduced in [4]. The switch-mode amplifier can approach 100% efficiency, and switching at a very high frequency (VHF, 30-300 MHz) does not introduce additional interference in the regulated range. Nevertheless, this approach still operates based on feedback and faces similar bandwidth and attenuation limitations as the linear AEF, and approaching maximum theoretical performance requires a very complex compensation circuit which can be quite sensitive to the impedance of the power converter, the source, and the line impedance stabilization network (LISN).

In contrast, the exemplary synchronous switch-mode AEF employs a minimal number of components to filter out large AC ripple currents from the power converter. The synchronous switch-mode AEF can switch at the same frequency as the main power converter without requiring any feedback (with its attendant bandwidth limitations, attenuation limitations, and complex compensation). Indeed, it may be controlled directly from the gate signals of the power converter. The filter achieves extremely high current attenuation of over 71 dB at the switching frequency of 150 kHz while consuming only 0.23 W for filtering ac ripple current from a 320 W dc-dc boost converter.

CONCLUSION

It must also be noted that, as used in the specification and the appended claims, the singular forms "a," "an," and "the" include plural referents unless the context clearly dictates otherwise. Ranges may be expressed herein as from "about" or "approximately" one particular value and/or to "about" or "approximately" another particular value. When such a range is expressed, other exemplary embodiments include from the one particular value and/or to the other particular value.

By "comprising" or "containing" or "including" is meant that at least the named compound, element, particle, or method step is present in the composition or article or method, but does not exclude the presence of other compounds, materials, particles, method steps, even if the other such compounds, material, particles, method steps have the same function as what is named.

In describing example embodiments, terminology will be resorted to for the sake of clarity. It is intended that each term contemplates its broadest meaning as understood by those skilled in the art and includes all technical equivalents that operate in a similar manner to accomplish a similar purpose. It is also to be understood that the mention of one or more steps of a method does not preclude the presence of additional method steps or intervening method steps between those steps expressly identified. Steps of a method may be performed in a different order than those described herein without departing from the scope of the disclosed technology. Similarly, it is also to be understood that the mention of one or more components in a device or system does not preclude the presence of additional components or intervening components between those components expressly identified.

Unless otherwise expressly stated, it is in no way intended that any method set forth herein be construed as requiring that its steps be performed in a specific order. Accordingly, where a method claim does not actually recite an order to be followed by its steps, or it is not otherwise specifically stated in the claims or descriptions that the steps are to be limited to a specific order, it is in no way intended that an order be inferred, in any respect. This holds for any possible non-express basis for interpretation, including matters of logic with respect to arrangement of steps or operational flow; plain meaning derived from grammatical organization or punctuation; the number or type of embodiments described in the specification.

The following patents, applications, and publications as listed below and throughout this document are hereby incorporated by reference in their entirety herein.

REFERENCE LIST

[1] Y. Yang, "EMI Noise Reduction Techniques for High Frequency Power Converters," Ph.D. dissertation, Virginia Polytechnic Institute and State University, 2018.
[2] N. Poon, J. Liu, C. Tse, and M. Pong, "Techniques for input ripple current cancellation: Classification and implementation [in SMPS]," IEEE Transactions on Power Electronics, vol. 15, no. 6, pp. 1144-1152, November 2000.
[3] R. Goswami, S. Wang, E. Solodovnik, and K. J. Karimi, "Differential Mode Active EMI Filter Design for a Boost Power Factor Correction AC/DC Converter," IEEE Journal of Emerging and Selected Topics in Power Electronics, vol. 7, no. 1, pp. 576-590, March 2019.
[4] D. T. Nguyen, E. Macias, and A. J. Hanson, "Active EMI Filter with Switch-Mode Amplifier for High Efficiency," in 2022 IEEE Applied Power Electronics Conference and Exposition (APEC), March 2022.
[5] D. T. Nguyen, C. Deng, E. Macias and A. J. Hanson, "Synchronously Switched Active EMI Filter," 2022 IEEE Energy Conversion Congress and Exposition (ECCE), Detroit, MI, USA, 2022, pp. 1-8, doi: 10.1109/ECCE50734.2022.9948006.

[6] M. Ali, E. Laboure, and F. Costa, "Integrated hybrid EMI filter: Study and realization of the active part," in 2013 *15th European Conference on Power Electronics and Applications (EPE)*. Lille, France: IEEE, September 2013, pp. 1-8.

[7] R. Goswami and S. Wang, "Investigation of multiple feedback active filter configurations for differential mode (DM) electromagnetic interference (EMI) noise in AC/DC converter applications," in IECON 2017-*43rd Annual Conference of the IEEE Industrial Electronics Society*, October 2017, pp. 7018-7023.

[8] Y. Sha, W. Chen, Z. Zhao, F. Zhang, C. Pei, and Z. Chen, "Research of active EMI suppression strategy for high power density power supply," in 2018 *IEEE Applied Power Electronics Conference and Exposition (APEC)*, March 2018, pp. 611-614.

[9] Z. Zhang, W. Chen, A. M. Bazzi, S. Ramsay, J. Czapor, and J. Aslanidis, "A new active EMI filter with virtual impedance enhancement," in 2018 *IEEE Applied Power Electronics Conference and Exposition (APEC)*. San Antonio, TX, USA: IEEE, March 2018, pp. 2393-2397.

[10] L. Dai, W. Chen, Y. Yang, R. Wang, and X. Yang, "Design of Active EMI Filters With the Integrated Passive Component," in 2019 *IEEE Applied Power Electronics Conference and Exposition (APEC)*, March 2019, pp. 640-643.

[11] R. Goswami, S. Wang, E. Solodovnik, and K. J. Karimi, "Differential Mode Active EMI Filter Design for a Boost Power Factor Correction AC/DC Converter," *IEEE Journal of Emerging and Selected Topics in Power Electronics*, vol. 7, no. 1, pp. 576-590, March 2019.

[12] S. Jiang, Y. Liu, W. Liang, J. Peng, and H. Jiang, "Active EMI Filter Design With a Modified LCL-LC Filter for Single-Phase Grid-Connected Inverter in Vehicle-to-Grid Application," *IEEE Transactions on Vehicular Technology*, vol. 68, no. 11, pp. 10,639-10,650, November 2019.

[13] M. Najjar, A. Kouchaki, and M. Nymand, "Evaluation of Active Common Mode Filter Utilization for Size Optimization of a 20 kW Power Factor Correction," in 2019 *IEEE 13th International Conference on Compatibility, Power Electronics and Power Engineering (CPEPOWERENG)*, April 2019, pp. 1-5.

[14] Y. Zhang, Q. Li, and D. Jiang, "A Motor CM Impedance Based Transformerless Active EMI Filter for DC-Side Common-Mode EMI Suppression in Motor Drive System," *IEEE Transactions on Power Electronics*, vol. 35, no. 10, pp. 10,238-10,248, October 2020.

[15] Z. Wang, "Conducted EMI Noise Prediction and Filter Design Optimization," Ph.D. dissertation, Virginia Polytechnic Institute and State University, 2018.

[16] A. J. Hanson, J. A. Belk, S. Lim, C. R. Sullivan, and D. J. Perreault, "Measurements and Performance Factor Comparisons of Magnetic Materials at High Frequency," *IEEE Transactions on Power Electronics*, vol. 31, no. 11, pp. 7909-7925, November 2016.

[17] S. Das, I. Pan, S. Saha, A. Kumar, S. Das, and A. Gupta, "Revisiting oustaloup's recursive filter for analog realization of fractional order differ integrators," in 2011 *International Conference on Energy, Automation and Signal*, 2011, pp. 1-6.

[18] R. Matu, "Application of fractional order calculus to control theory," *International Journal of Mathematical Models and Methods in Applied Sciences*, vol. 5, pp. 1162-1169, January 2011.

[19] J. Valsa, P. Dvok, and M. Friedl, "Network model of the CPE," *Radioengineering*, vol. 20, September 2011.

[20] E. Gonzalez, Dork, C. Monje, J. Valsa, F. Caluyo, and I. Petr, "Conceptual Design of a Selectable Fractional-Order Differentiator for Industrial applications," *Fractional Calculus and Applied Analysis*, vol. 17, September 2014.

[21] Y. Zhang, J. Strydom, M. de Rooij, and D. Maksimovi, "Envelope tracking gan power supply for 4 g cell phone base stations," in 2016 *IEEE Applied Power Electronics Conference and Exposition (APEC)*, 2016, pp. 2292-2297.

[22] Y. Zhang, M. Rodriguez, and D. Maksimovi, "100 mhz, 20 v, 90 synchronous buck converter with integrated gate driver," in 2014 *IEEE Energy Conversion Congress and Exposition (ECCE)*, 2014, pp. 3664-3671.

[23] R. W. Erickson and D. Maksimovic, *Fundamentals of Power Electronics*, 3rd ed. Springer, 2020.

[24] L. Mirkin and Z. J. Palmor, Control Issues in Systems with Loop Delays. Boston, MA: Birkhäuser Boston, 2005, pp. 627-648.

[25] W. Chen, W. Zhang, X. Yang, Z. Sheng, and Z. Wang, "An Experimental Study of Common- and Differential-Mode Active EMI Filter Compensation Characteristics," *IEEE Transactions on Electromagnetic Compatibility*, vol. 51, no. 3, pp. 683-691, August 2009.

[26] P. Wang, C. Tao, and J. Zhang, "Research and design of a common mode hybrid EMI filter for switch-mode power supply," in 2009 *3rd International Conference on Power Electronics Systems and Applications (PESA)*, 2009, pp. 1-4.

[27] M. L. Heldwein, H. Ertl, J. Biela, and J. W. Kolar, "Implementation of a Transformerless Common-Mode Active Filter for Offline Converter Systems," *IEEE Transactions on Industrial Electronics*, vol. 57, no. 5, pp. 1772-1786, May 2010.

What is claimed is:

1. An apparatus comprising:
a power converter or electric circuit comprising a first set of switching elements and a first inductor or capacitor located at an input to the set of switching elements, wherein an input source voltage is applied to the power converter or electric circuit comprising the first set of switching elements, and the first inductor or capacitor have a voltage rating equal to or greater than the applied input source voltage; and
a switch-mode active electromagnetic interference cancellation circuit comprising a second set of switching elements, said switch-mode active electromagnetic interference cancellation circuit having an output voltage less than the input source voltage, and a second inductor coupled to the first inductor or capacitor through a second capacitor, said second inductor further coupled to an output from the switch-mode active electromagnetic interference cancellation circuit, the second inductor having a voltage rating equal to or greater than the output voltage rating of the switch-mode active electromagnetic interference cancellation circuit and less than the voltage rating of the first capacitor or inductor, wherein the second capacitor isolates and protects the second inductor and the switch-mode active electromagnetic interference cancellation circuit from the input source voltage, and wherein a controller is operatively coupled to the second set of switching elements to control switching operations of the second set of switching elements to apply an opposing alternating voltage or current to the second inductor to cancel high-frequency ripples flowing through the first inductor or capacitor generated from switching of the first set of switching elements.

2. The apparatus of claim 1, wherein the controller is configured to control switching operations of the second set of switching elements based on control signals that control the first set of switching elements.

3. The apparatus of claim 1, wherein the first set of switching elements comprise a boost converter.

4. The apparatus of claim 1, wherein the alternating voltage or current in the second inductor is applied at a lower voltage or current to that of the first inductor to cancel electromagnetic interference generated by the first set of switching elements.

5. The apparatus of claim 1, wherein the apparatus is a power converter, and wherein the power converter is configured as at least one of a buck-boost converter, a single-ended primary-inductor converter (SEPIC), a Cuk converter, a boost converter, and an interleaved boost converter.

6. The apparatus of claim 1, further comprising a passive electromagnetic interference (EMI) filter, a high-frequency LC filter, and/or an active EMI filter comprising a linear amplifier.

7. The apparatus of claim 1, wherein the second inductor comprises a piezoelectric device having both inductive and capacitive properties.

8. The apparatus of claim 1, wherein the second inductor of the switch-mode active electromagnetic interference cancellation circuit has an inductance value smaller than an inductance value of the first inductor of the power converter.

9. The apparatus of claim 8, wherein the power converter or electric circuit has an output voltage of 400 volts, and the inductance value of the second inductor is 50 times smaller than the inductance value of the first inductor of the power converter.

10. The apparatus of claim 1, wherein the second set of switching elements of the switch-mode active electromagnetic interference cancellation circuit is coupled to the second inductor and second capacitor through a winding, wherein the output of the switch-mode active electromagnetic interference cancellation circuit generates an opposite voltage at the second inductor and the second capacitor to that of the first inductor or capacitor.

11. The apparatus of claim 10, wherein the second inductor and the second capacitor is connected in series with the first inductor or capacitor.

12. A method to filter EMI of a power converter or electric circuit, the power converter or electric circuit comprising a first set of switching elements and a first inductor or capacitor configured to perform a power conversion or switching task, the method comprising:
applying an input source voltage to the first inductor or capacitor of the power converter or electric circuit, the first inductor or capacitor have a voltage rating equal to or greater than the applied input source voltage;
controlling, via circuitry or instructions, switching operations of a second set of switching elements of a switch-mode active electromagnetic interference cancellation circuit to operatively apply an opposite alternating voltage or current at a second inductor that is coupled to the first inductor or capacitor of the first set of switching elements through a second capacitor to cancel high-frequency ripples flowing through (i) the first inductor or capacitor and (ii) associated with switching of the first set of switching elements, said second capacitor further coupled to an output of the switch-mode active electromagnetic interference cancellation circuit wherein the switch-mode active electromagnetic interference cancellation circuit has an output voltage less than the input source voltage, the second inductor having a voltage rating equal to or greater than the output voltage of the switch-mode active electromagnetic interference cancellation circuit and less than the voltage rating of the first capacitor or inductor, wherein the second capacitor isolates and protects the second inductor and the switch-mode active electromagnetic interference cancellation circuit from the input source voltage, and
wherein the switching operations of the second set of switching elements are at a frequency range outside a defined-EMI or pre-defined range.

13. The method of claim 12, further comprising:
receiving a feedback signal sampled at the input to the first set of switching elements of the power converter; and
adjusting the controlling of the switching operations based on the received feedback signal.

14. A method to filter EMI of a power converter or electric circuit, the power converter or electric circuit comprising a first set of switching elements and a first inductor or capacitor configured to perform a power conversion task, the method comprising:
applying an input source voltage to the first inductor or capacitor of the power converter or electric circuit, the first inductor or capacitor have a voltage rating equal to or greater than the applied input source voltage;
controlling, via circuitry or instructions, switching operations of the first set of switching elements to perform the power conversion task;
controlling, via circuitry or instructions, switching operations of a second set of switching elements of a switch-mode active electromagnetic interference cancellation circuit to operatively apply an opposite alternating voltage or current at a second inductor that is coupled to an input of the first set of switching elements through a second capacitor to cancel high-frequency ripples flowing through a first inductor of the power converter, said second inductor further coupled to an output from the switch-mode active electromagnetic interference cancellation circuit, the second inductor having a voltage rating equal to or greater than the output voltage rating of the switch-mode active electromagnetic interference cancellation circuit and less than the voltage rating of the first capacitor or inductor, wherein the second capacitor isolates and protects the second inductor and the switch-mode active electromagnetic interference cancellation circuit from the input source voltage; and
adjusting the controlling of the switching operations of the second set of switching elements based on the controlling of the switching operations of the first set of switching elements.

15. The method of claim 14, wherein the power converter is configured as at least one of a buck-boost converter, a single-ended primary-inductor converter (SEPIC) converter, a Cuk converter, a boost converter, and an interleaved boost converter.

16. The method of claim 14, wherein the opposite voltage or current in the second inductor is applied at a lower voltage or current to that of the first inductor to cancel electromagnetic interference generated by the first set of switching elements.

17. The method of claim 14, wherein the power converter includes a passive electromagnetic interference (EMI) filter, a high-frequency LC filter, and/or an active EMI filter based on a linear amplifier.

18. The method of claim 14, wherein the second inductor of the switch-mode active electromagnetic interference cancellation circuit has an inductance value smaller than an inductance value of the first inductor of the power converter.

19. The method of claim 18, wherein the power converter or electric circuit has an output voltage of 400 volts, and the inductance value of the second inductor is 50 times smaller than the inductance value of the first inductor of the power converter.

* * * * *